May 5, 1953 C. R. DOTY 2,637,399
RECORD CONTROLLED PERFORATING MACHINE
Filed July 13, 1950 28 Sheets-Sheet 1

INVENTOR
CHARLES R. DOTY
BY Charles P. Boberg
ATTORNEY

May 5, 1953          C. R. DOTY          2,637,399

RECORD CONTROLLED PERFORATING MACHINE

Filed July 13, 1950          28 Sheets-Sheet 2

INVENTOR
CHARLES R. DOTY
BY Charles P. Boberg
ATTORNEY

May 5, 1953 C. R. DOTY 2,637,399
RECORD CONTROLLED PERFORATING MACHINE
Filed July 13, 1950 28 Sheets-Sheet 4

INVENTOR
CHARLES R. DOTY
BY Charles P. Boberg
ATTORNEY

May 5, 1953 C. R. DOTY 2,637,399
RECORD CONTROLLED PERFORATING MACHINE
Filed July 13, 1950 28 Sheets-Sheet 8
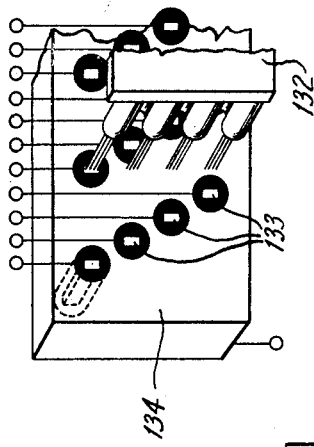
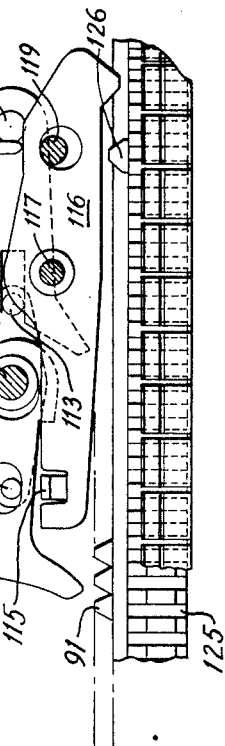
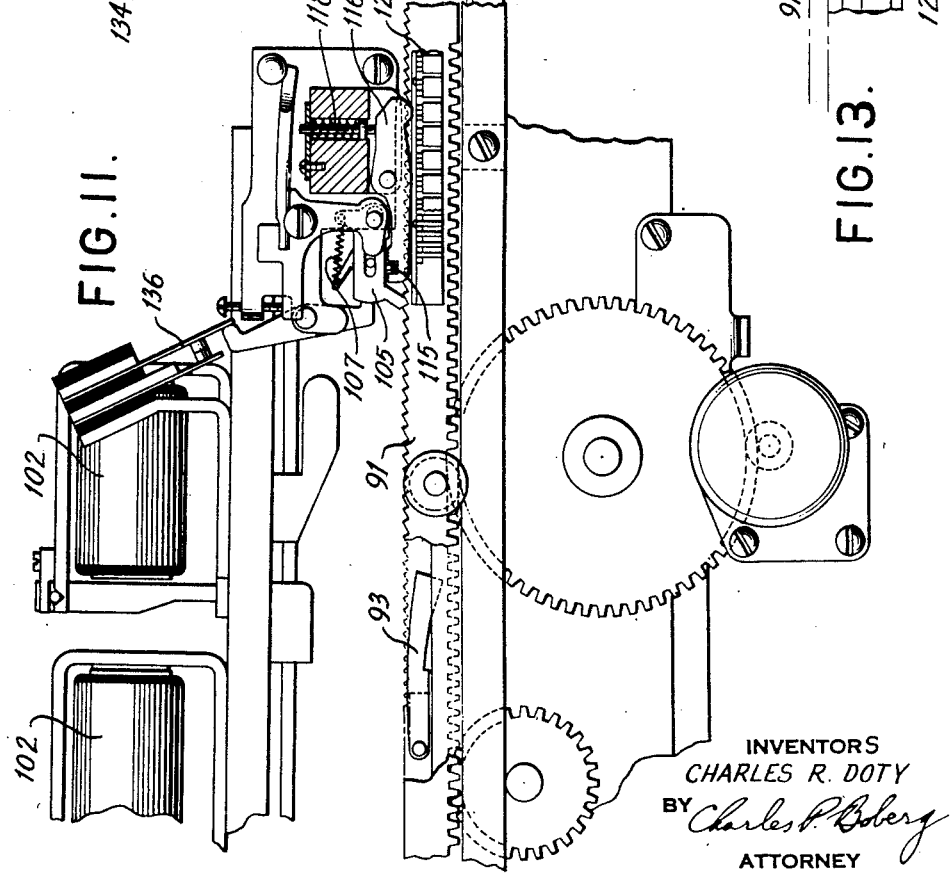
INVENTORS
CHARLES R. DOTY
BY Charles P. Boberg
ATTORNEY May 5, 1953  C. R. DOTY  2,637,399
RECORD CONTROLLED PERFORATING MACHINE
Filed July 13, 1950  28 Sheets-Sheet 11

INVENTOR
CHARLES R. DOTY
BY Charles P. Boberg
ATTORNEY

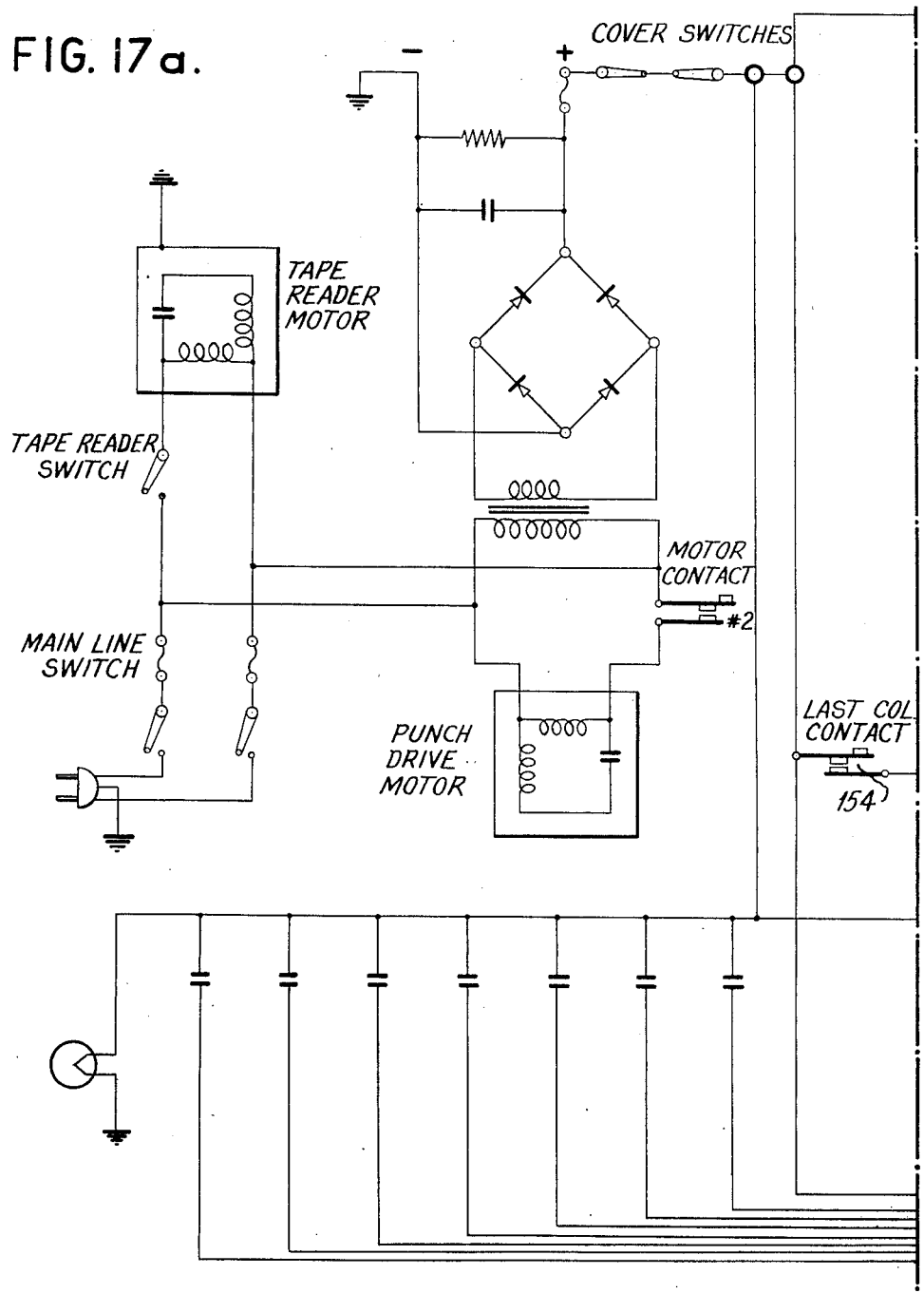

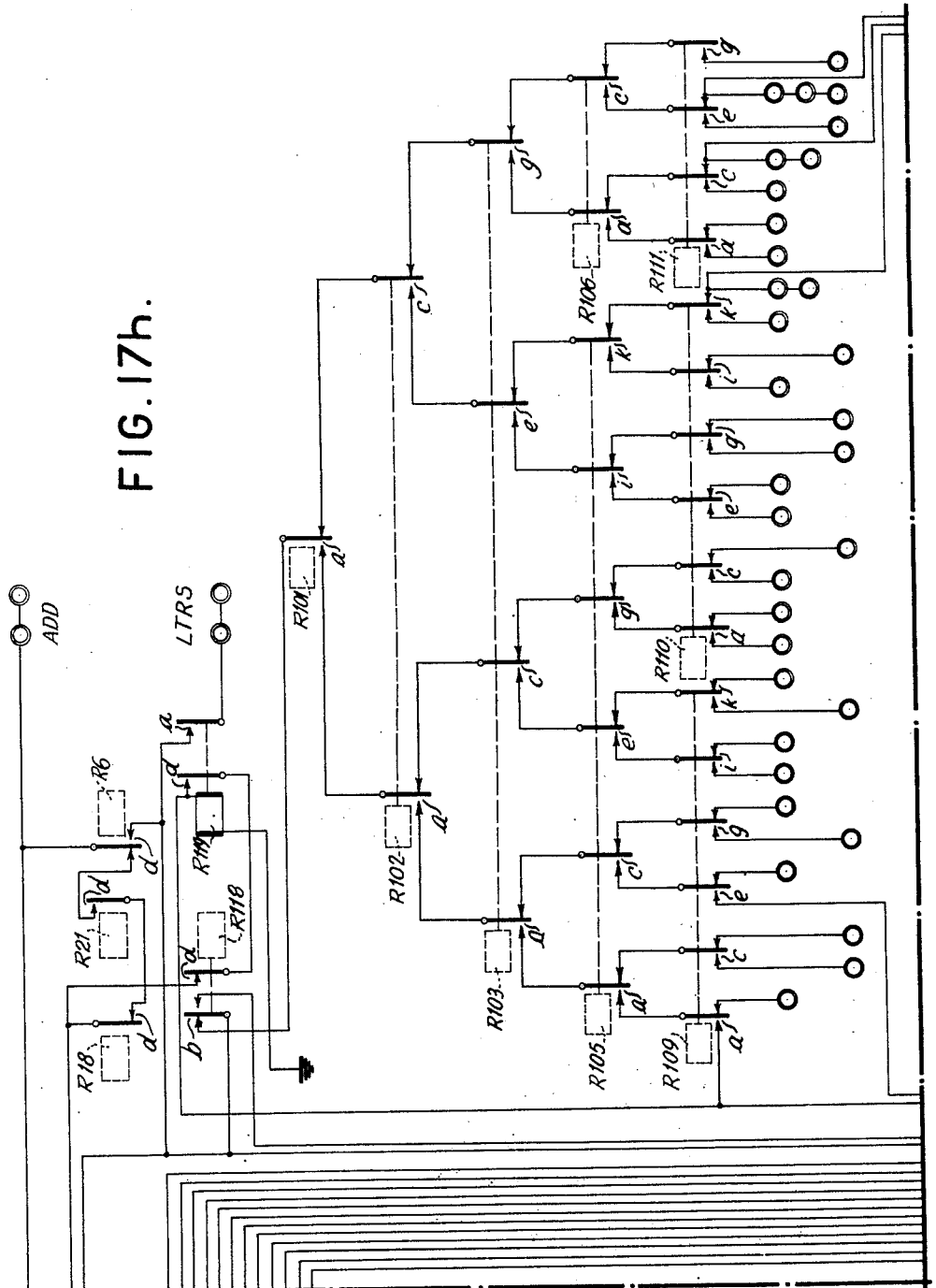

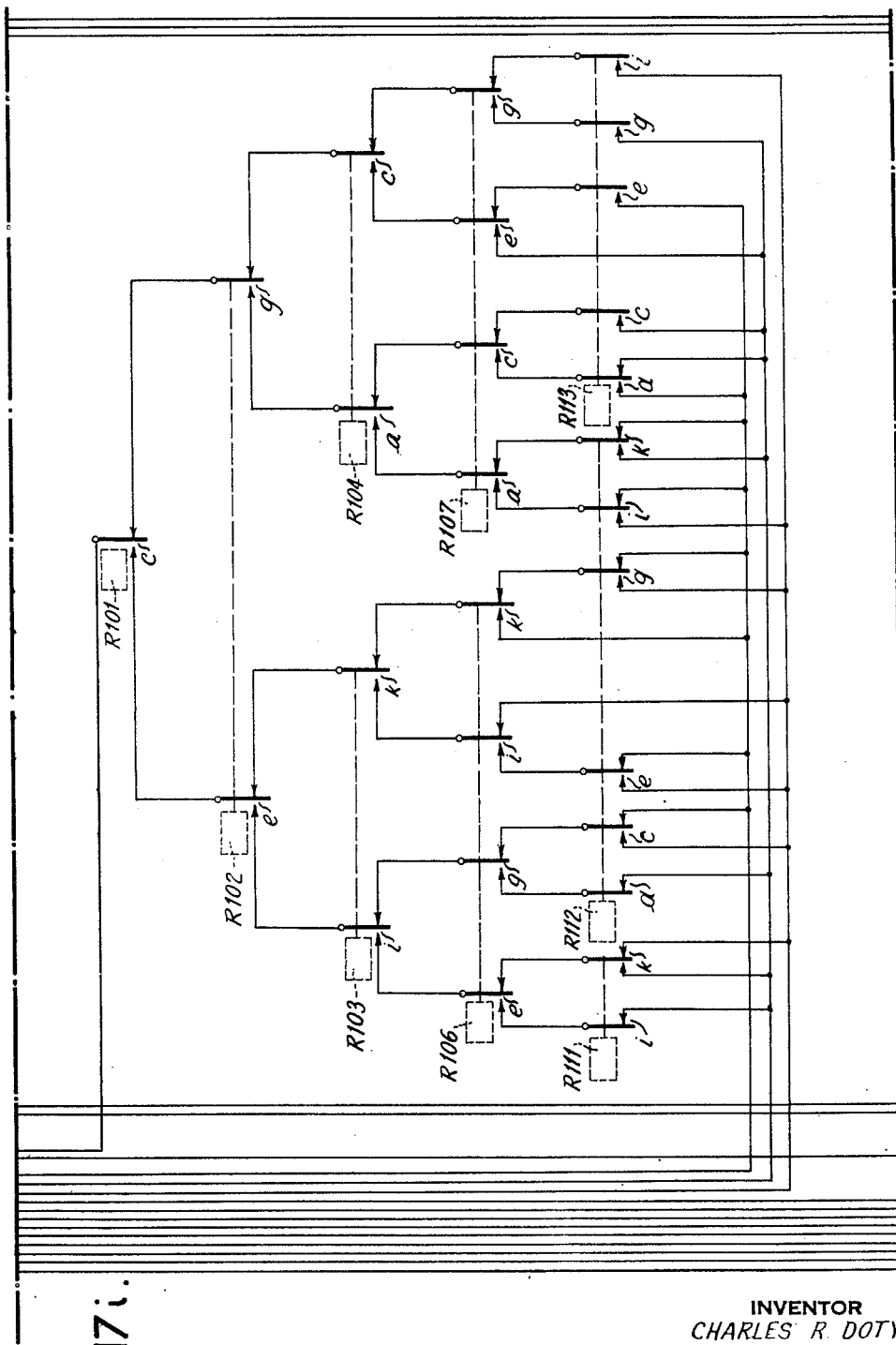

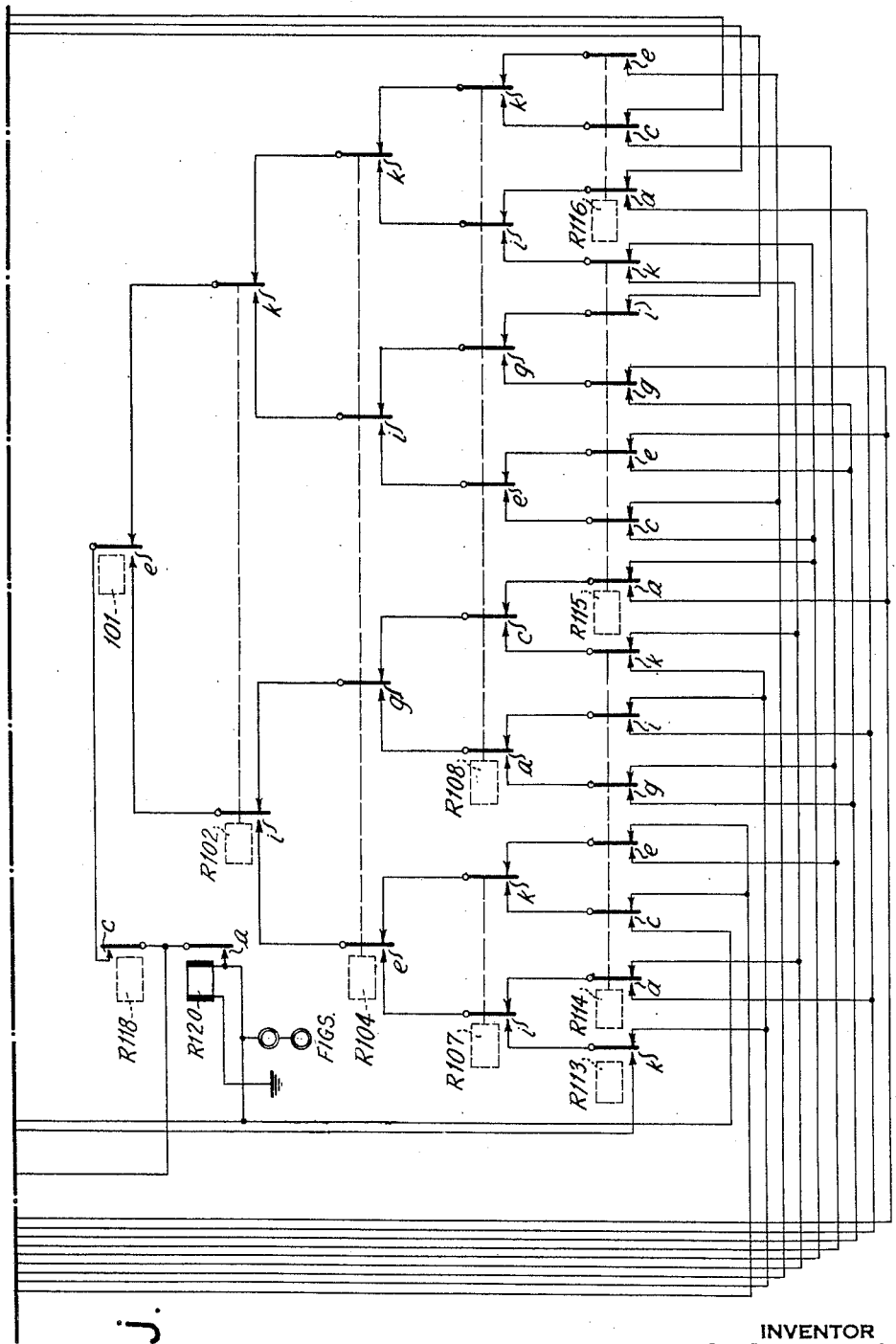

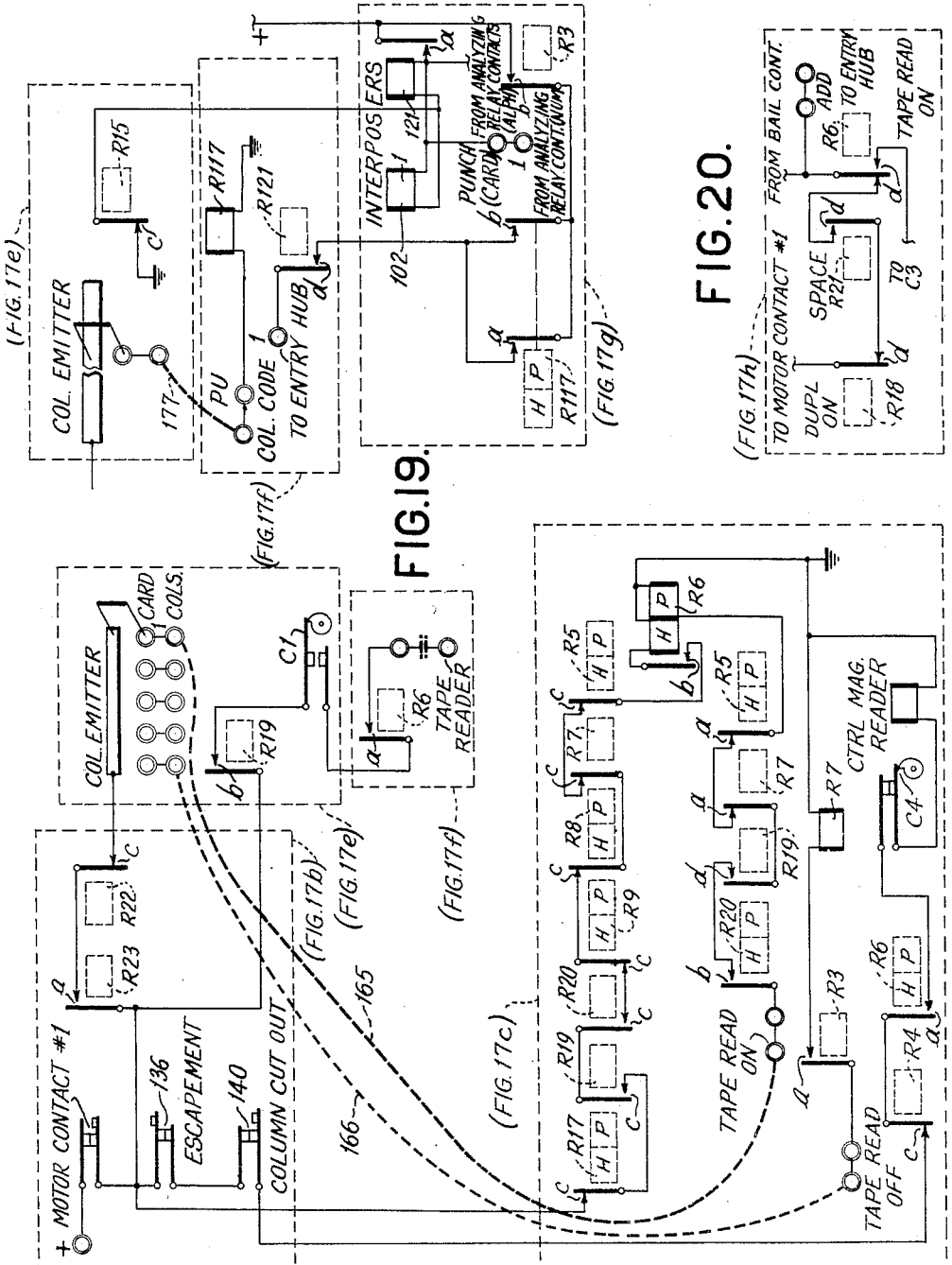

May 5, 1953  C. R. DOTY  2,637,399
RECORD CONTROLLED PERFORATING MACHINE
Filed July 13, 1950  28 Sheets-Sheet 23

INVENTOR
CHARLES R. DOTY
BY Charles P. Boberg
ATTORNEY

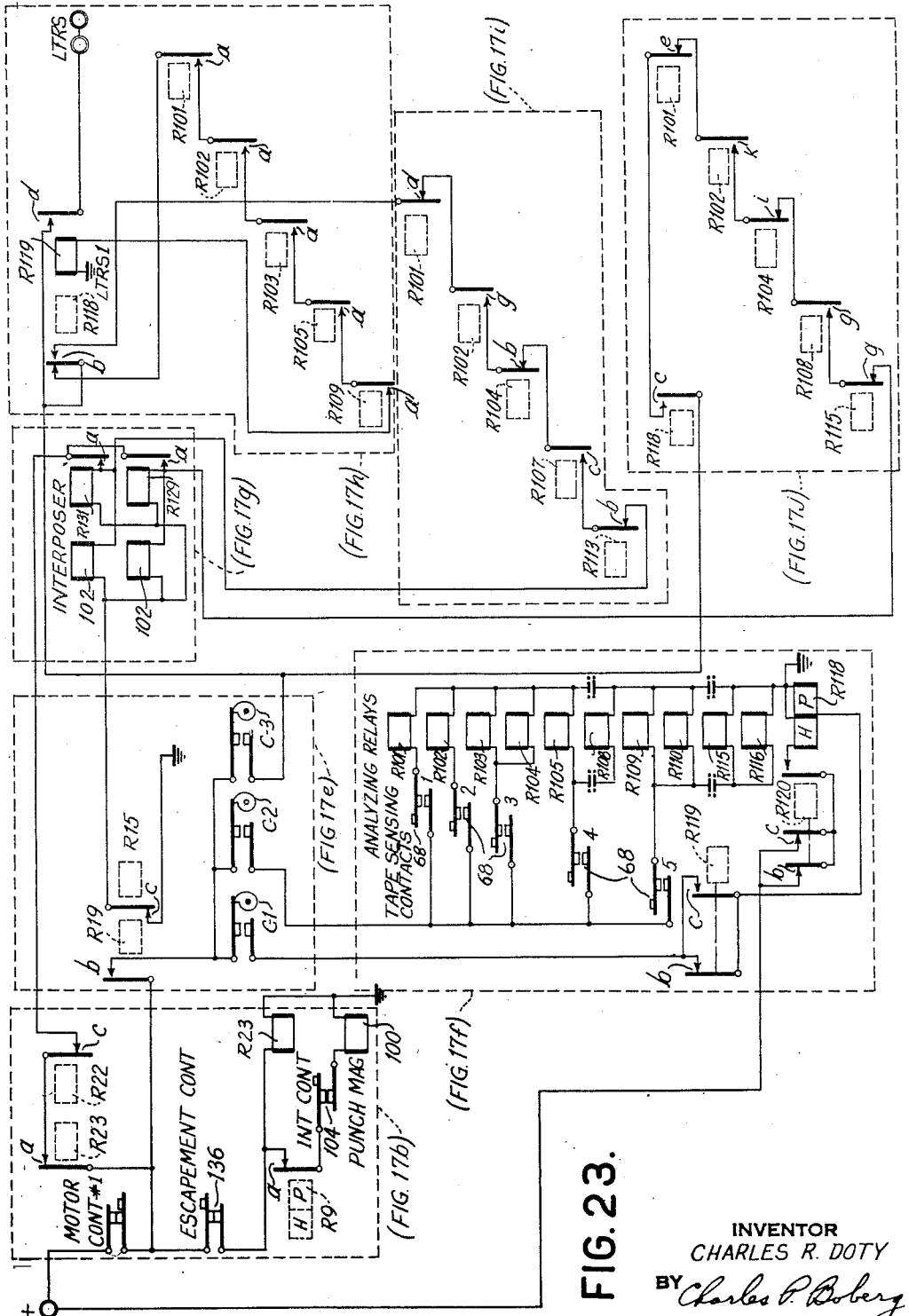

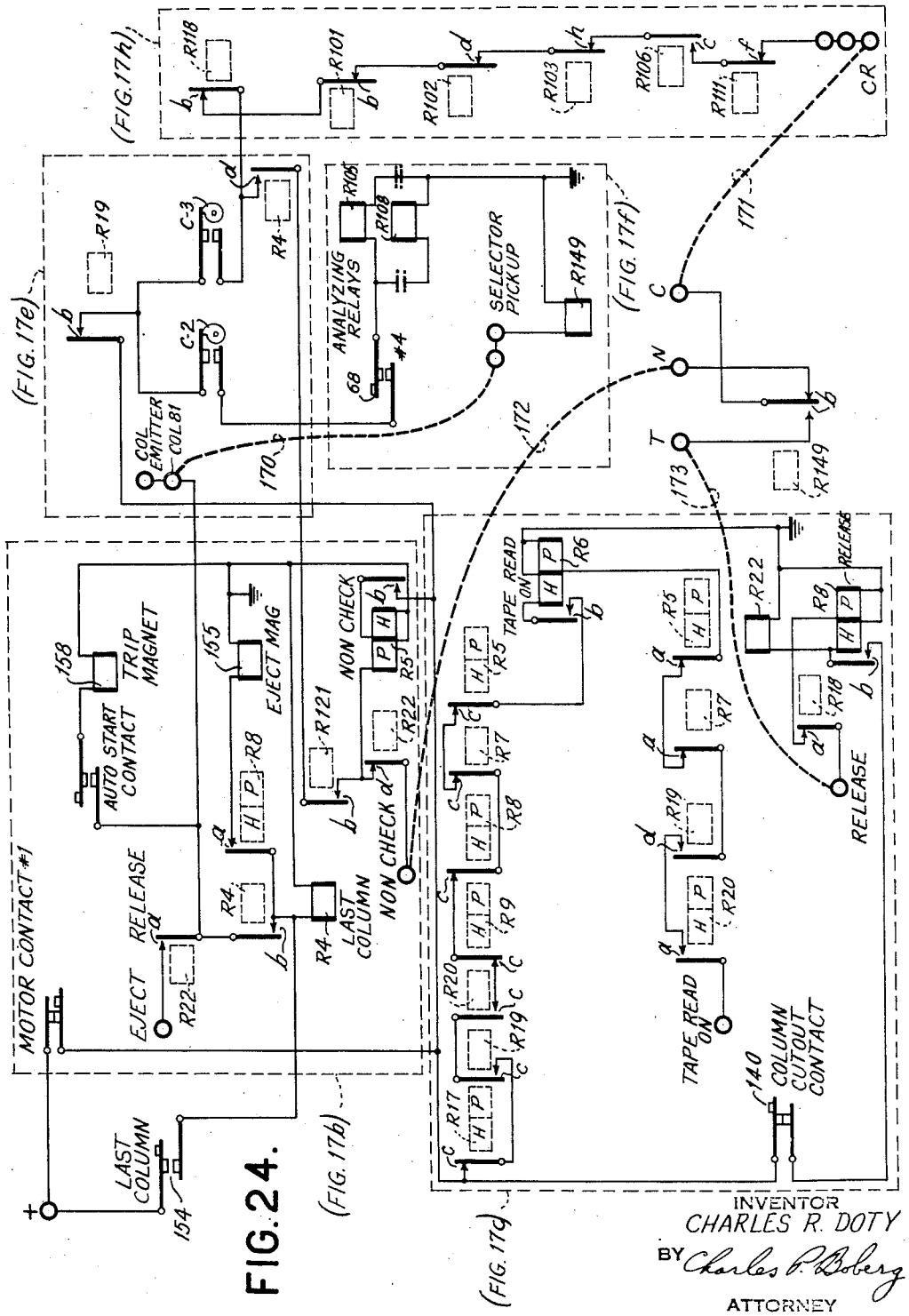

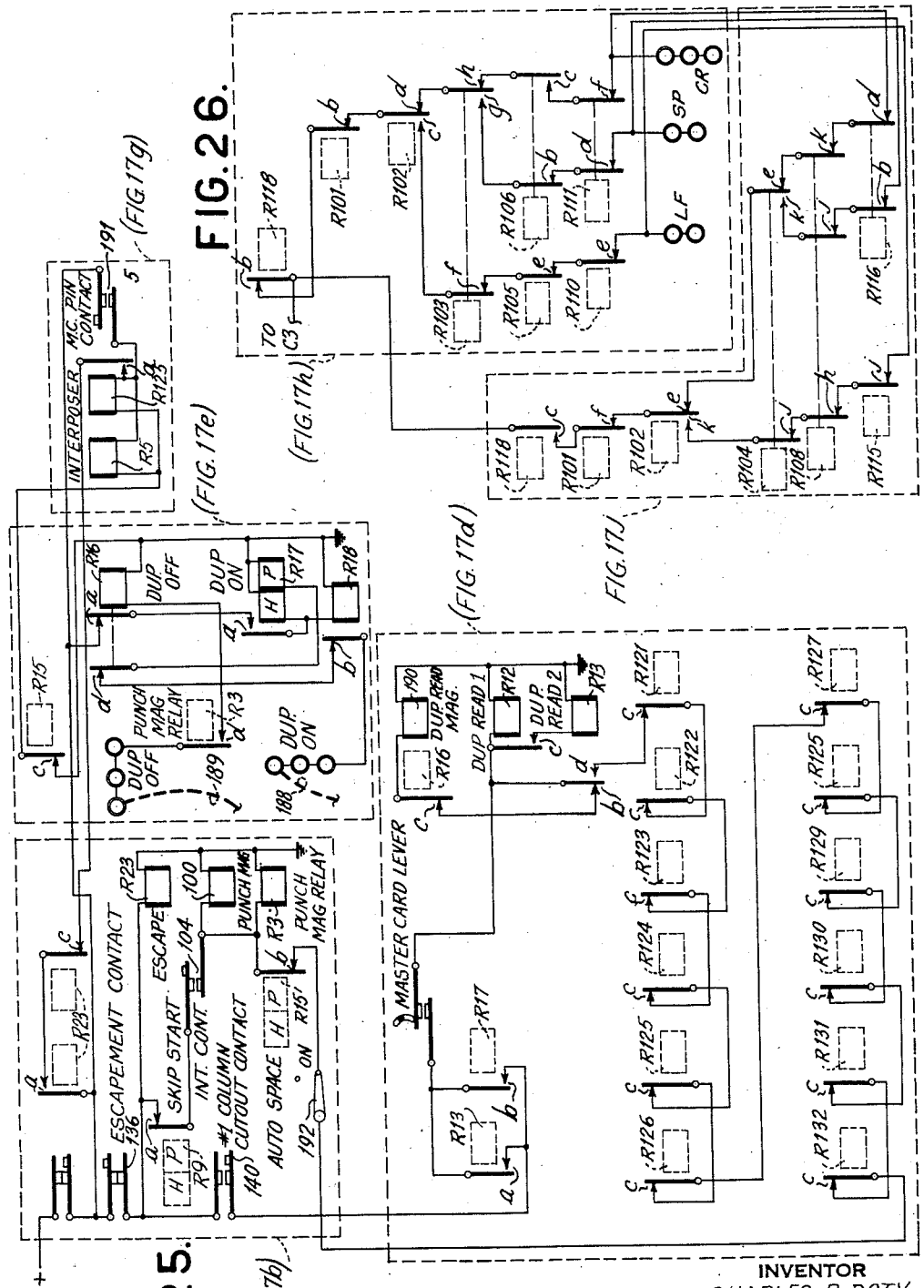

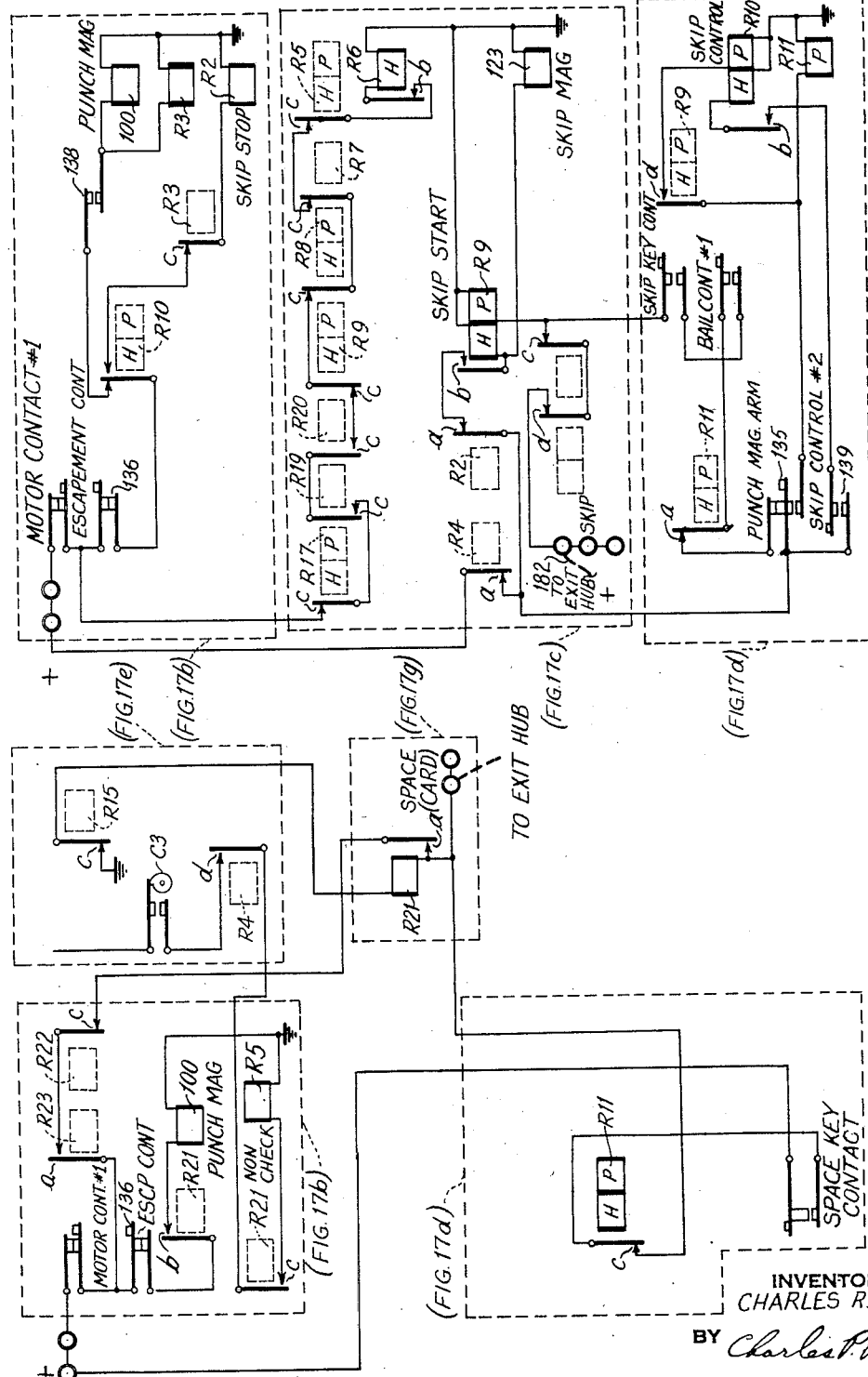

May 5, 1953  C. R. DOTY  2,637,399
RECORD CONTROLLED PERFORATING MACHINE
Filed July 13, 1950  28 Sheets-Sheet 28
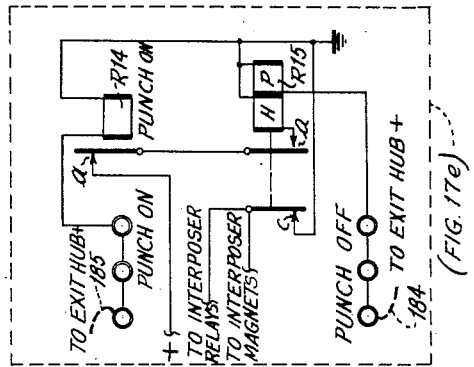
FIG. 30.
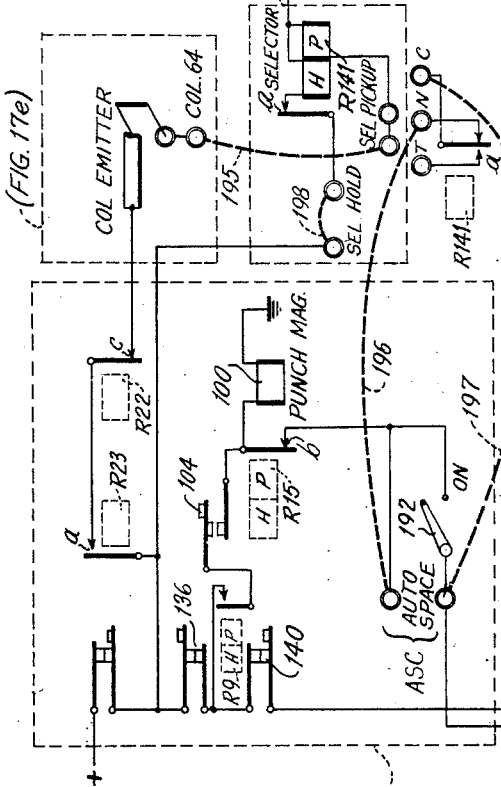
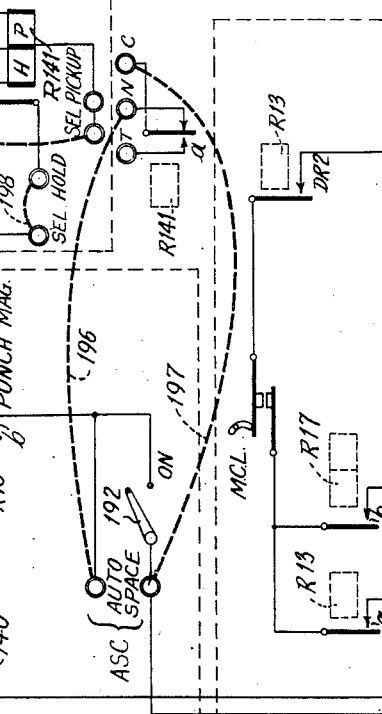
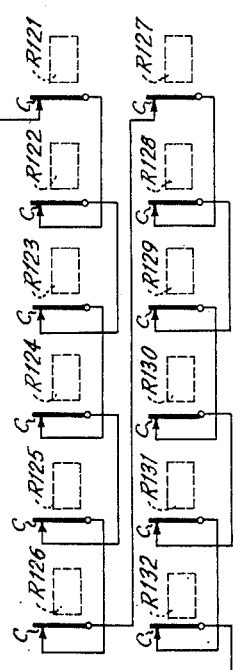
FIG. 29.
INVENTOR
CHARLES R. DOTY
BY Charles P. Boberg
ATTORNEY Patented May 5, 1953

2,637,399

UNITED STATES PATENT OFFICE 2,637,399

RECORD CONTROLLED PERFORATING MACHINE

Charles R. Doty, Poughkeepsie, N. Y., assignor to International Business Machines Corporation, New York, N. Y., a corporation of New York Application July 13, 1950, Serial No. 173,661

21 Claims. (Cl. 164—115)

This invention relates to tape-controlled card perforating machines and particularly to improvements which afford more controls of a flexible nature for such machines.

Tape-controlled card perforating machines are required to perform a number of functions in connection with the reading of tapes and the perforation of cards. These functions may include, for example, skipping the card columns in which no information is to be perforated, releasing and ejecting a card when it reaches a selected columnar position, column-spacing the card, column-spacing the tape, checking the columnar position of the card against a supposedly corresponding position of the tape, suppressing the reading of the tape or the perforating of the card under certain conditions, duplicating master card information into the card that is being perforated, recoding a digit or a special character read in the tape to a different form of digit or character in the card, and a variety of other functions. The conditions under which these various functions are performed by the machine may be determined by the columnar position of the card, or by certain control information which is present in the tape. In some instances it may be desired that the information which is being perforated into the card control the execution of a function. Many times it is necessary that the machine perform a complex program of functions in order to handle a particular tape-to-card recording operation.

Prior tape-controlled card perforating machines were equipped with some controls that were flexible (that is, capable of being selected by means of plugged circuit connections) and other controls that were permanently built into the machine during manufacture thereof to meet particular operating conditions. A machine of this character was disclosed in Patent No. 2,340,801 issued to C. R. Doty and E. J. Rabenda on February 1, 1944. In this particular machine there were many functions which were controlled through a plugboard that could be wired in accordance with a desired plan or program of operation. Other functions, however, were built into the machine and could not be altered. For example, if it were desired that certain card columns be skipped in response to a particular tape code, such as a "Figures G" code, the machine would be wired internally in such fashion that a skip function would be performed whenever a "Figures G" code was sensed in the tape, and this, therefore, would be an inherent and invariable characteristic of that specific machine. This practice was feasible in situations where only a limited number of standard operations were likely to be called for, as was usually the case. The present demand, however, is for a machine that is capable of handling a wide variety of problems without necessitating any modification or redesign of the machine internally in order to meet new situations as they might arise.

An object of the present invention is to provide an improved tape-to-card perforating machine having all circuit lines provided with readily removable circuit connections (plug-wires) for handling all of the problems that formerly were handled by machines having a variety of fixed circuit connections that were not readily removable and which were designed for specific applications, and it is also an object of the instant machine to perform many additional functions for which no provisions were made in prior machines.

A further object is to provide an improved tape-to-card perforating machine in which all of the functions and all of the control impulses for initiating those functions are brought out to a readily accessible control panel, so that the program of operations followed by the machine is dependent entirely upon the external wiring of the control panel. In this way, the program of the machine can be varied to an extent not possible heretofore without altering the internal circuits of the machine.

A still further object is to provide an improved tape-to-card perforating machine in which the various tape code designations are brought out to the control panel so that selected designations in the tape may control certain functions of the machine through the medium of readily changeable external wiring rather than through internal wiring which cannot be altered without redesigning the machine.

Another object is to provide a novel tape-to-card perforating machine in which impulses representing a code punched in any selected column of the card that is being produced may be brought out to the readily accessible control panel for governing certain functions of the machine, such as skipping, releasing, punching, tape reading and duplication.

Still another object is to provide an improved tape-to-card perforating machine in which the program of operations followed by the machine is determined entirely by the plugging of the control panel.

A feature of the invention is the provision of a novel system of relay interlocks enabling all circuits for the control of machine functions to be routed through the control panel.

Other features include the provision of special positions on the control panel for the emission of impulses whenever particular operations are performed, such as a change from alphabetic to numerical data (or vice versa), the ejection of a card, column spacing, carriage return, the reading of each character by the tape reader, the punching of each character in the card, and others.

Still another feature is the provision of selector relays which can (in accordance with the control panel plugging) be picked up for a particular card column only, or picked up and held throughout the card punching operation, as preferred. The "hold" feature is useful in the event one should desire to make (or break) a given circuit controlled by a selector starting from the moment that the selector is picked up and continuing until the card is discharged.

A still further feature is the provision of a pluggable auto-space control to permit the duplication of all blank columns in the master card or the duplication of selected blank columns only, as desired.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 11 is a fragmentary sectional view of the card punch unit showing the escapement mechanism and certain other parts.

Fig. 12 is a fragmentary perspective view of the card column emitter.

Fig. 13 is a more detailed sectional view of the escapement mechanism of the card punch.

Fig. 17 is a diagram showing the manner in which Figs. 17a to 17j are assembled.

Figs. 17a to 17j, inclusive, constitute a general wiring diagram of the machine.

Figs. 18 to 30, inclusive, are simplified circuit diagrams based on the general wiring diagram and illustrating the circuits utilized to perform certain specified functions of the machine.

General description

Figure 1:
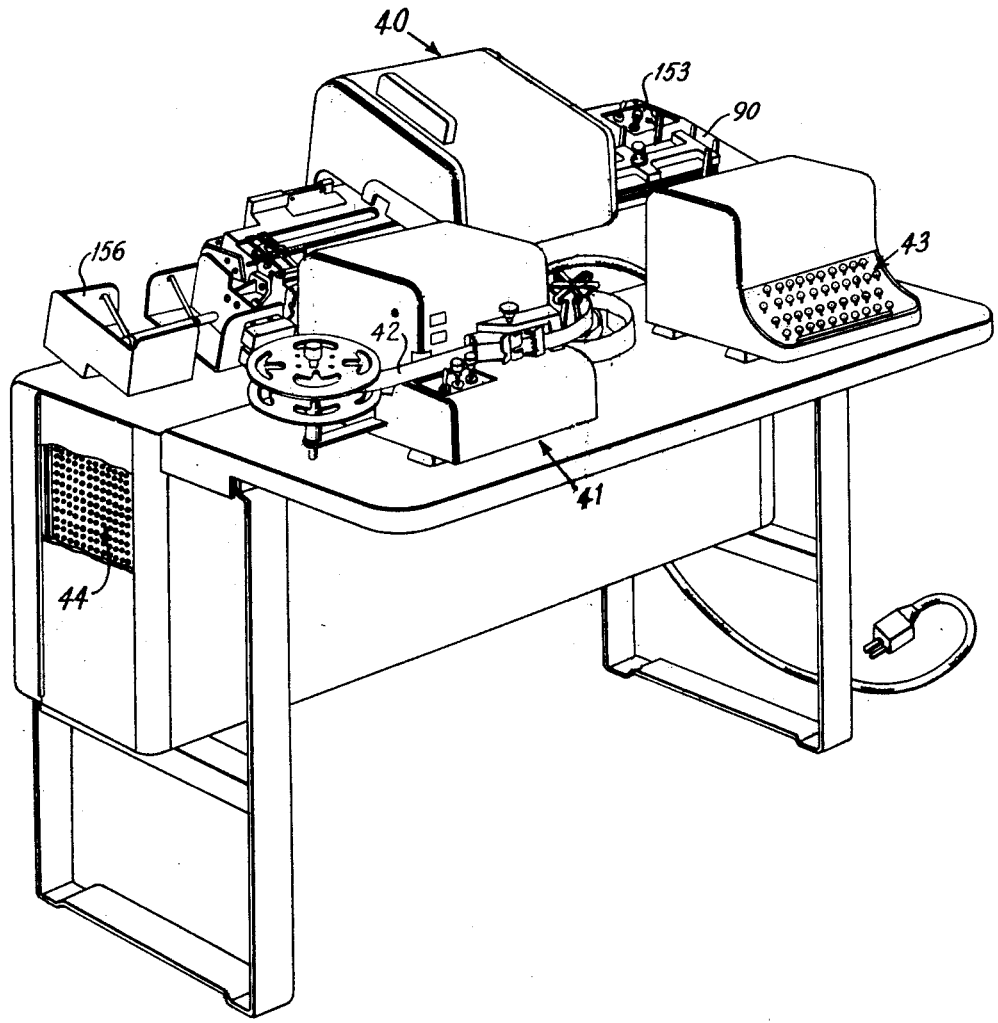
Fig. 1 is a general perspective view of a tape-controlled card perforating machine which embodies the principles of the invention, this machine also including provisions for the control of card punching by a master card or keyboard.

Referring to Fig. 1, the present machine comprises a card punch unit 40 which is controlled by a tape reader unit 41 for perforating record cards in accordance with code designations contained in a perforated record tape 42. A manual keyboard 43 may be included also for key punching information in the cards wherever desired. The machine has a general similarity to known forms of tape-controlled card perforating apparatus, such as that disclosed in the United States patent to C. R. Doty and E. J. Rabenda, No. 2,340,801, issued February 1, 1944. In accordance with the present invention, various improvements have been incorporated in machines of the type just mentioned whereby a more flexible (that is, more readily changed) form of control panel 44 (Figs. 1 and 14) may be employed. All machine functions and all control impulses are brought out to appropriately designated plug-hubs on this control panel, so that the operations of the machine can be determined entirely by the plugging of said panel.

The record tape 42 (Figs. 3 and 4) which controls the punching of the cards is of the type used in telegraphy to control the transmission of messages. The tape 42 may be prepared under the control of an original set of record cards at one location (for example, a branch office) and then sent by mail or messenger to another location (the home office, for example) at which a duplicate set of cards will be prepared under the control of said tape. Alternatively, a tape prepared under the control of original record cards at the first location may control the transmission of information by wire to the second location, where an identical tape is prepared for use by the tape-controlled card perforating machine shown in Fig. 1. Either of these practices will effect the reproduction of the original record cards without requiring that these record cards be shipped from one location to another.

Figure 3:
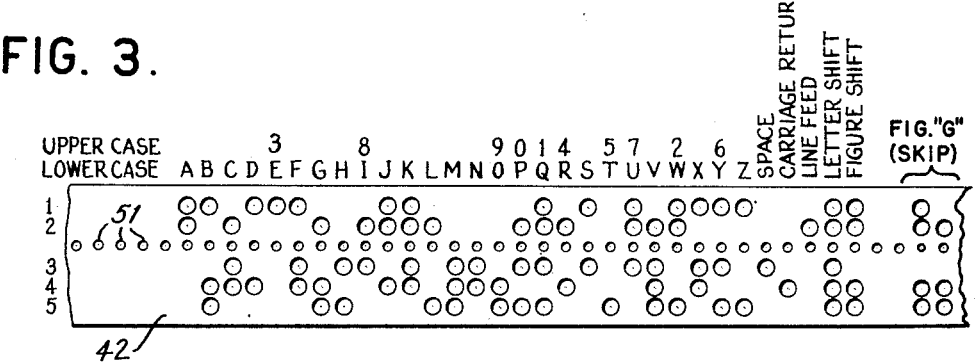
Fig. 3 is a detail view of a record tape containing perforated code designations which are employed to represent data and functions according to a five-unit telegraphic code.
Figure 4:
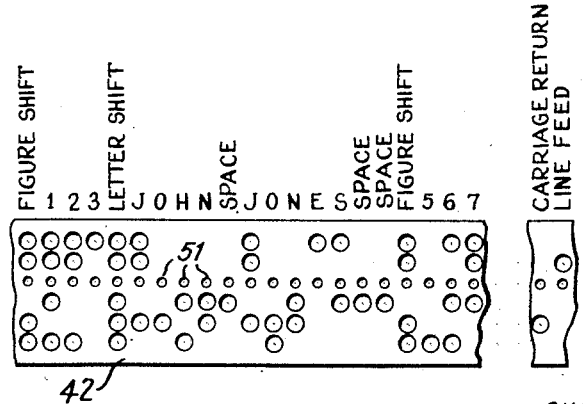
Fig. 4 is a fragmentary detail view showing a portion of a perforated record tape bearing an exemplary message.

The illustrated tape employs a five-unit telegraphic code familiar to those skilled in the art. As shown in Fig. 3, a code designation is assigned to each of the letters of the alphabet, and additional code designations are assigned to the "space," "carriage return," and "line feed" functions. Ordinarily, in telegraphic work, the space code would control the character spacing of a document carriage, while the carriage return and line feed codes respectively would control the return of the document carriage and the advance of the document to present a new line at printing position. In the present instance, however, the space code effects the column spacing of a card, and the carriage return code is employed for checking the position of the card at a given time. For convenience, the terms "space" and "carriage return" continue to be used in this art for identifying the two codes just mentioned. No special function is assigned to the line feed code herein, although provision is made for emitting an impulse whenever such a code is sensed, as will be explained presently. In addition to the foregoing functional codes, there are the letter-shift and figure-shift codes which effect shifts between numerical (upper case) characters and alphabetical (lower case) characters. For instance, a single hole in the Number 1 position on the tape can represent either the letter "E" or the digit "3," depending upon whether this code punching is preceded by a letter-shift or a figure-shift code in the tape. As indicated in Fig. 4, a figure-shift code signifies that all code designations following it represent upper case characters, until such time as a letter-shift code is encountered, whereupon nothing but lower case characters are represented until another figure-shift occurs. The space, carriage return and line feed codes represent the same functions irrespective of whether upper case or lower case characters are being recorded.

Special mention should be made of the "Figures G" code, Fig. 3, which consists of a figure-shift code followed by a "G" code. In conventional practice this combination of codes signifies a tape-controlled skip operation, and the assumption is made herein that this practice will continue to prevail. However, the flexibility of the present machine is such that merely by changing the plugwire connections, it would be possible to use any other tape code for effecting a skip, if desired, and by the same token it would be possible to use the "Figures G" code to control some function other than skipping. Therefore, it should be understood that the present machine is not limited (as were prior machines) to the use of a "Figures G" code for controlling a skip.

Figure 2:
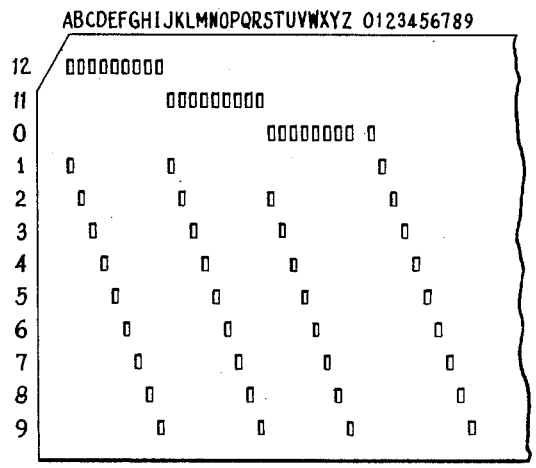
Fig. 2 is a fragmentary detail view of a statistical record card having data-representing perforations formed therein according to a differential Hollerith, statistical code.

Fig. 2 illustrates the manner in which a record card is perforated to represent information according to a twelve-unit statistical code. As shown, the digits are represented by single perforations in any of the index rows 0 to 9. Alphabetic characters are represented by single perforations in the 1 to 9 index rows combined with perforations in the 0, 11 and 12 index rows. This statistical code is familiar to those skilled in the art and need not be explained further.

*Control panel*

Figure 14:
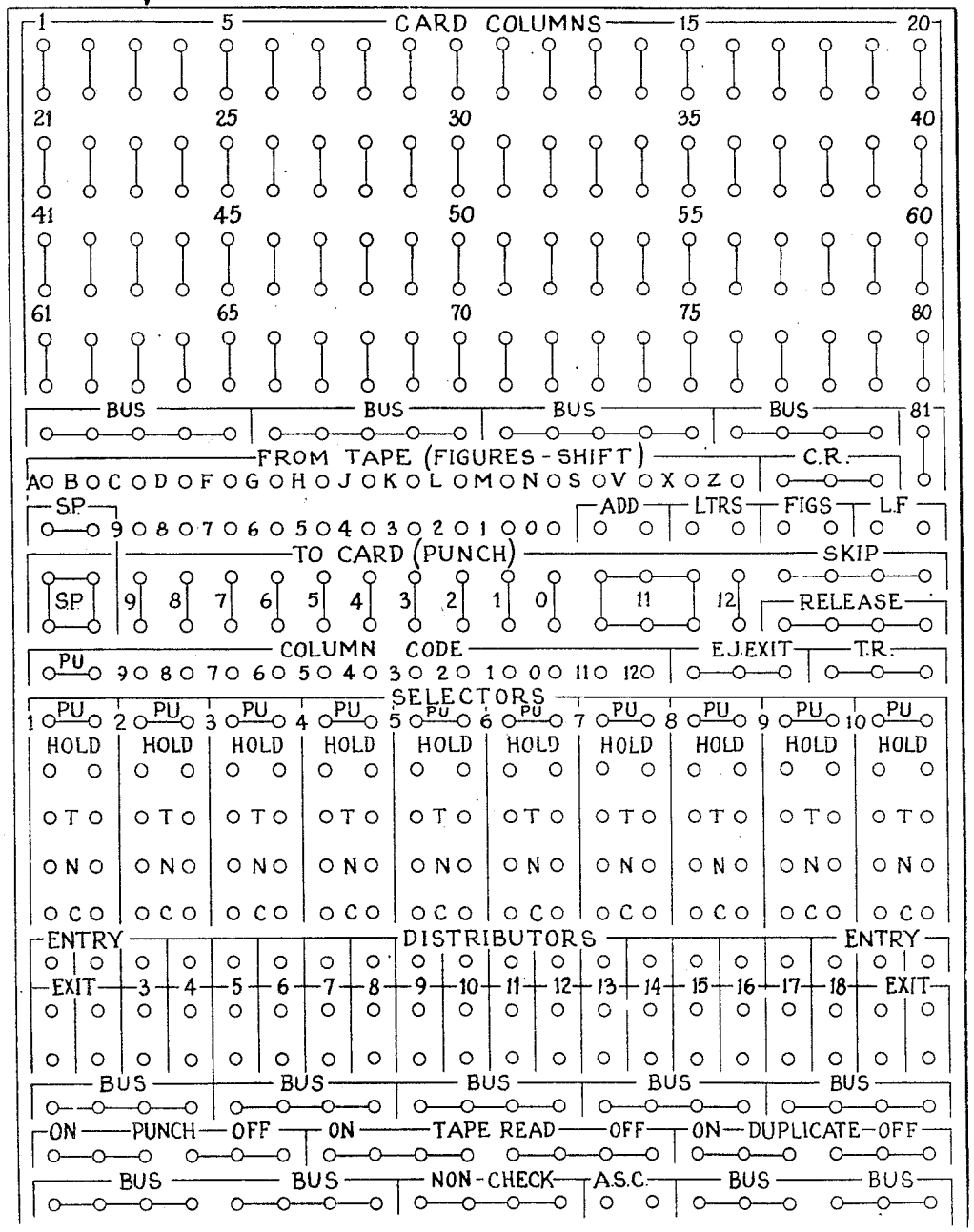
Fig. 14 is a schematic view of the control panel.

The layout of the control panel 44 is illustrated in Fig. 14. At the top of the panel, under the notation "Card Columns," there are 80 pairs of exit hubs respectively corresponding to the 80 columns of a standard statistical record card. As each card column is brought into the punching position, an impulse is emitted at the corresponding pair of column-representing exit hubs. Thus, the hubs 1 to 80 are consecutively activated to emit impulses in synchronism with the columnar movement of the card through punching position. The card column impulses, as will appear hereinafter, can be routed through plugwires on the control panel 44 to various entry hubs on the control panel for causing selected machine functions to be performed in accordance with the columnar position of the card. When column 80 is passed, the hubs designated "81" are activated, and the impulse emitted thereby can be used for checking purposes or to cause card ejection.

There are numerous sets of hubs designated "Bus" on the control panel 44. Each set of bus hubs may be used as a common connection to eliminate split wiring on the control panel.

Various exit hubs are activated whenever certain code designations are read from the tape. The hubs designated "From Tape (Figs.-Shift)" are exits for impulses which occur each time the respective characters are sensed. For example, it may be desired to emit an impulse whenever an alphabetic character such as "G" is preceded by a figures-shift code in the tape, so that this may be used to control a particular function such as skipping. Likewise, the sensing of any digit in the tape will activate a corresponding digit hub. Furthermore, there are provided exit hubs for the emission of impulses whenever the space (SP), carriage return (CR), line feed (LF), letters-shift (LTRS) and figures-shift (FIGS) codes are sensed in the tape. Certain exit hubs, designated "Add," emit impulses whenever any code is read in the tape or when a key or space bar on the keyboard is depressed. The "add" impulse may be used to punch an additional perforation in any card column.

A group of entry hubs appearing under the notation "To Card (Punch)" causes a digit or a space code to be punched in the card whenever one of these hubs is impulsed. Normally, the various digit hubs 0 to 9 and the space (SP) hubs in the card punch group are wired directly to the corresponding digit and space hubs in the tape reading group immediately thereabove on the control panel 44. In the present instance the true alphabetic characters read from the tape effect the punching of alphabetic characters in the card independently of the control panel 44, but it would be within the purview of this invention to bring all of these characters out to the control panel if desired. The "11" and "12" hubs on the card punch group may be impulsed through plugwires to punch the corresponding index positions in the card. The various card punch hubs also emit impulses whenever the corresponding punch elements are actuated.

The entry hubs designated "Skip" may be selectively wired to any desired card column hub or tape reader hub or to any other exit hub on the control panel to initiate skipping of the card carriage, when a particular condition is fulfilled. Skipping is stopped automatically by skip stops on the carriage skip bar, as will be explained hereinafter. The skip hubs are also adapted to emit impulses whenever the skip key on the keyboard is depressed. If skipping is caused by a code in the tape, further reading of the tape is automatically suspended.

The entry hubs designated "Release" may be wired to a card column hub, "from tape" hub or other exit hub to effect the release of a card at any columnar position. If the release is caused by a tape code, further reading of the tape is automatically stopped. These hubs also serve as exits when a manual release is effected.

Certain hubs designated "Ej. Exit" are exits for an impulse which occurs during each card ejection. Other hubs designated "TR" are exits for an impulse following each code read from the tape. These impulses can be used to effect any desired machine functions, through the necessary control panel wiring.

Certain hubs designated "Column Code" are used to emit digit-representing impulses corresponding to the punching in any selected card column. This is effected through the medium of a column code device, later explained herein. The column code device is picked up at any selected card column by plugging the pickup (PU) hubs thereof to the desired card column hub, and when that column is being perforated, the digit hubs of the column code device are activated in accordance with the character perforated in that column. The column code impulses can be used to effect functions of the machine in the same manner as do the card column impulses and the tape reader impulses.

The machine is equipped with a number of selector relays having connections to the hubs designated "Selectors" on the control panel 44. Selectors, in general, are familiar to those skilled in the art. Each selector has pickup (PU) hubs, transferred (T) hubs, normal (N) hubs and common (C) hubs. The N and C hubs normally are connected together internally, but when the selector is picked up or transferred, the internal path between N and C is interrupted, and an internal path is established between C and T. The present invention features the use of "Hold" hubs which may be jumpered together for causing the selector to remain transferred until the card cycle is completed. If the selector is to be held only for the duration of the pickup impulse, the hold hubs are disconnected.

Various distributors or one-way circuit devices are utilized to facilitate multiple wiring without "back-circuits." Each distributor has an entry hub and two exit hubs and an impulse can pass through the distributor in only one direction, that is, from the entry to an exit.

The "Punch On" and "Punch Off" hubs are employed to interrupt the operation of the card punching unit for limited intervals without stopping the tape reader. Normally, the card punch is automatically turned on at the start of a card cycle. When it is desired to stop punching in response to a particular tape code, the "Punch Off" hubs are plugged to the appropriate tape character hub. Similarly, punching may be resumed in response to a tape code by an appropriate plugging connection to the "Punch On" hubs.

The operation of the tape reader is controlled by the plugging of the "Tape Read On" and "Tape Read Off" entry hubs. The manner in which this is done will become obvious as the description proceeds. Certain hubs designated "Duplicate On" and "Duplicate Off" are used to start and stop duplication from a master card. It is common practice to insert information from a master card into the card which is being prepared under the control of the tape. When duplication is in process, tape reading is automatically stopped.

The "Non-Check" entry hubs are used to stop the machine when the tape and card are out of step. Generally this is accomplished by plugging the CR hubs through a selector to the "Release" and "Non-Check" hubs, with the selector being picked up at the final card column. An operation of this type is described subsequently.

The "Auto-Space Control" (ASC) hubs are used to control the duplication of blank columns in the master card. The ASC hubs may be connected internally through an auto-space switch, in which case all blank columns in the master card are duplicated. Alternatively, the ASC switch may be left open and the ASC hubs activated through appropriate control panel wiring to permit the duplication of specific blank columns only.

Figure 15:
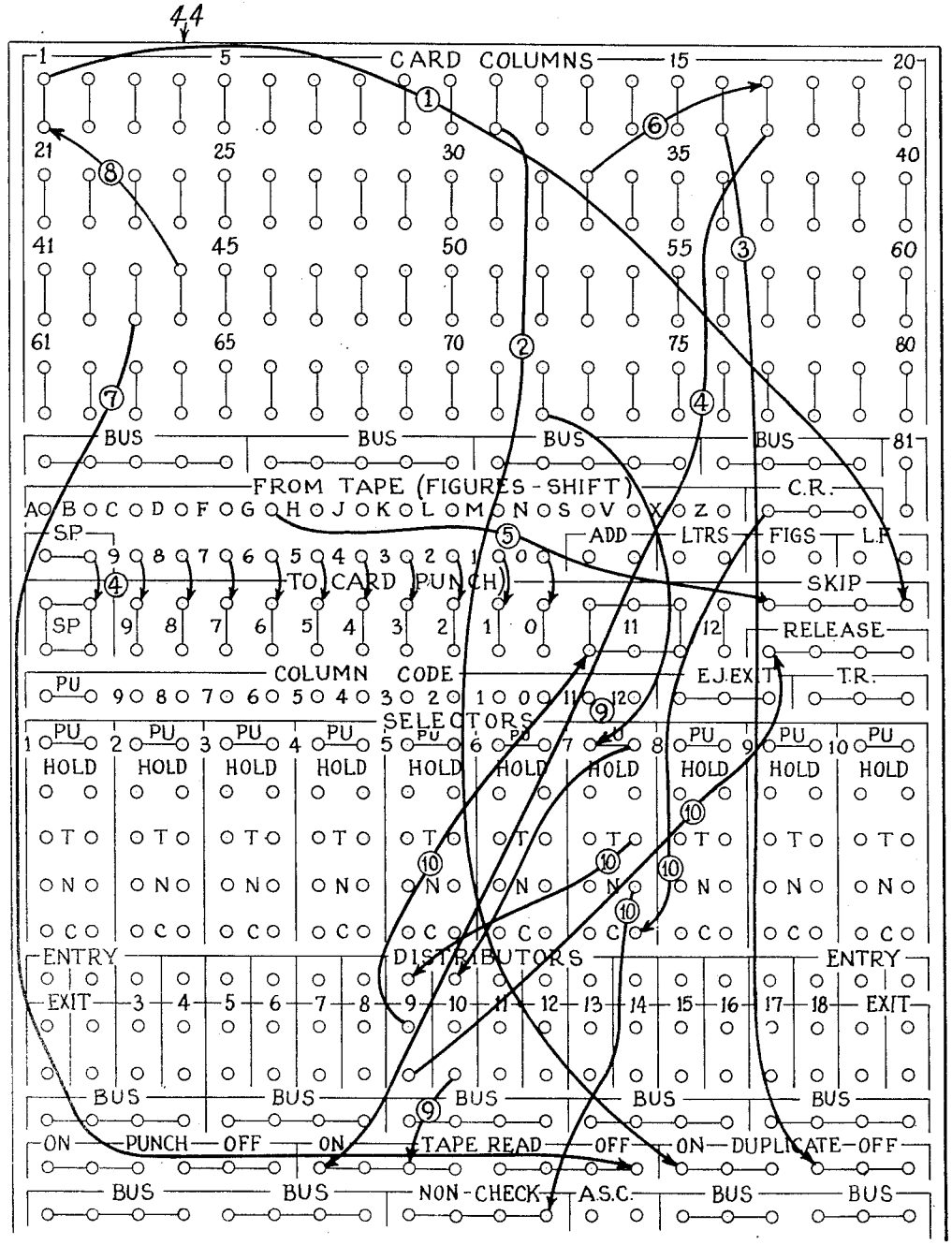
Fig. 15 is a schematic view showing the manner in which the control panel is plugged for a particular program of machine operations.
Figure 16:
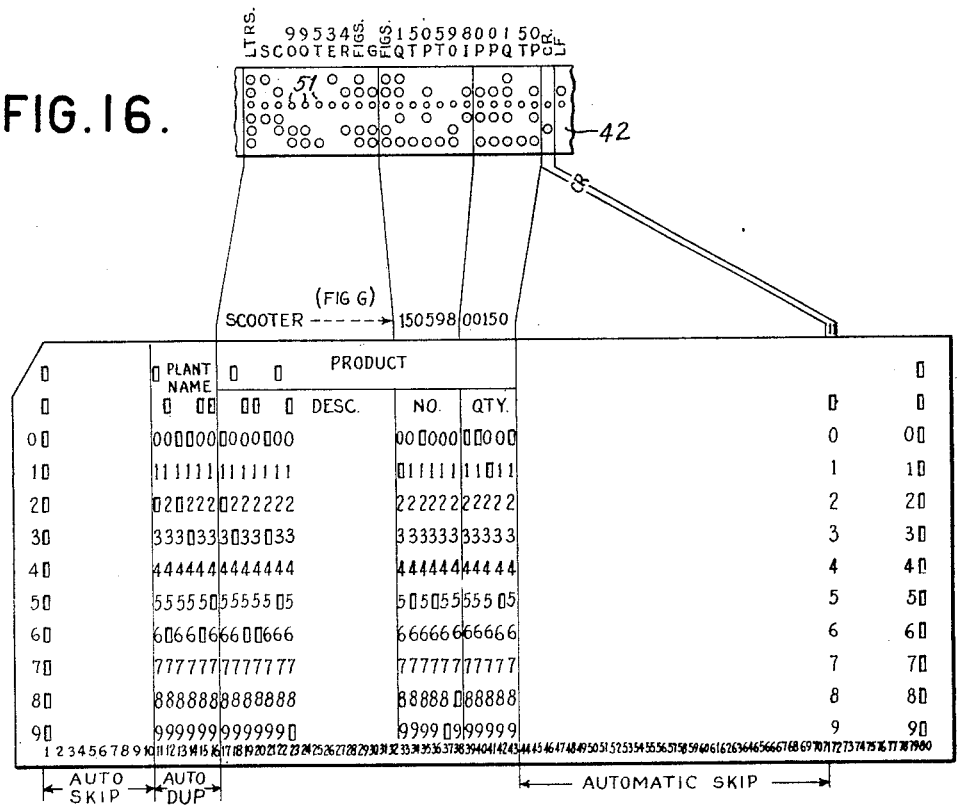
Fig. 16 is a schematic view of a control tape and a record card perforated under control thereof, said card having been perforated in a machine wired as indicated in Fig. 15.

Fig. 15 illustrates the manner in which the control panel 44 is wired to prepare the machine for a particular program of operations. Referring to Fig. 16, it is assumed that the first 10 columns of each card are to be automatically skipped. Columns 11 to 16 (plant name) are to be duplicated from the corresponding columns in the master card. The product description is perforated in columns 17 to 32 of the card. This description is of variable length, and after the last character has been perforated, the balance of the columns through column 32 should be skipped. This skipping operation is controlled by a "Figure G" code in the tape, that is, a figure-shift code preceding a "G" code. Columns 33 to 43 are perforated under tape control. Columns 44 to 71 are to be skipped automatically. The card should reach its column 72 position simultaneously with the reading of a carriage return "CR" symbol in the tape, and if this condition is fulfilled, the card should be released; otherwise the machine should be stopped since the card and the tape are out of step. The successive steps in the operation of the machine are performed as follows, reference being made to the plugwire connections in Fig. 15 which are numbered to correspond with the paragraphs below:

1. Column 1 starts skipping. A skip-stop insert in the adjustable skip bar (described hereinafter), at column 11, stops the skip.

2. Column 11, the first column on the card to be punched, is wired to Duplicate On.

3. This wire stops duplication after column 16.

4. Column 17 starts tape reading. Each space code punched in the tape is wired to space. As digit-for-digit punching is desired, the digit and punch hubs are connected.

5. Skipping is started when a fig-G is read in the tape. An insert at column 33 stops the skip. When a skip is started by the tape, tape reading is automatically stopped.

6. Tape reading is restarted at column 33. This column can be wired directly to Tape Read On, or as shown.

7. Column 43 stops tape reading. This is necessary because the skip to follow is not originated by the tape as in step 5.

8. Column 44 starts another skip. This column can be wired directly to skip, or as shown. The skip is stopped by an insert at column 72.

9. At column 72, CR should be read from the tape to punch an 11 and release the card. A selector is needed to control checking and releasing in response to a CR code; therefore, column 72 is wired to pick up selector 7 and, through distributor 10, to Tape Read On.

10. CR, read at column 72, passes through the transferred hubs of selector 7 to punch an 11 in that column and to release the card. With CR entered into a distributor, the two exits are available to control punching and releasing independently. Punch hubs must not be connected directly to release or any other functional hub. CR, read at any time other than at column 72, stops the machine, indicating that the card and the tape are not in step.

The foregoing is a description of a typical program of operations. The control panel 44 can, of course, be wired to control a large variety of programs. A table of machine functions and their corresponding control panel connections is set out below. It should be noted that this table, while fairly complete, does not exhaust all the possibilities of the machine, and additional uses will readily occur to those skilled in the art.

| Functions | Control Panel Connections | | |
|---|---|---|---|
| | From— | Through— | To— |
| Start punching in selected card column | Card column | Wire | Punch on. |
| Stop punching at selected card column | ----do---- | ----do---- | Punch off. |
| Start tape reading at given card position | ----do---- | ----do---- | Tape read on. |
| Stop tape reading at given card position | ----do---- | ----do---- | Tape read off. |
| Start duplication from master card | ----do---- | ----do---- | Duplicate on. |
| Stop duplication from master card | ----do---- | ----do---- | Duplicate off. |
| Cause selected card columns to be spaced | ----do---- | ----do---- | Space (card). |
| Start skipping with selected card column | ----do---- | ----do---- | Skip. |
| Release card at any columnar position | ----do---- | ----do---- | Release. |
| Control or modify the routing of impulses for any card position. | ----do---- | ----do---- | Selector pickup. |
| Gang punching (when tape read and duplicate are off). | ----do---- | Wire or distributor | Card punch (digits). |
| Start or stop punching for selected tape code | Tape character | Wire | Punch on or off. |
| Start or stop tape reading for selected tape code. | Tape character | ----do---- | Tape read on or off. |
| Start or stop duplication for selected tape code. | Tape character | ----do---- | Duplicate on or off. |
| Start skipping when selected tape code is read. | Tape character | ----do---- | Skip. |
| Release card when selected tape code is read | Tape character | ----do---- | Release. |
| Recode special character to digit | Tape character | Wire or distributor | Card punch (digits). |
| Recode zero to J in selected column only | Zero (tape) | Selector (normal); Selector (transf.) and distributor. | Zero card punch. Card punches 1 and 11. |
| Digit-for-digit punching | Tape digits | Wires | Card punch digits. |
| Space card columns for selected tape code | Space (tape) or Figs. shift. | Wire | Space (card). |
| Recode space to zero in selected column only | Space (tape) | Selector (normal); Selector (transf.) | Space (card). Zero card punch. |
| Check synchronism of card and tape (last column). | Carriage return (CR) | Selector (normal); Selector (transf.) | Non-check. Release. |
| Check synchronism of card and tape (alphabetic field). | Letters | Selector (normal) | Non-check. |
| Alphabetic tape information | ----do---- | Selector (transf. and distributor. | Punch off. |
| Extra 11 punched with any digit in a selected card column. | Add | Selector (transf.) | Card punch 11. |
| Extra 11 punched with only certain digits in a selected card column. | Digits (tape) | Selector (transf.) and distributor. | Card punch 11. |
| Selective skipping, release, punching, tape reading, duplication, checking, etc. in response to the punchings in a selected card | Card column; Column code digits | Wire; Wire, selector, or distributor. | Column code pickup. Appropriate entry hubs. |

Tape reader

Figure 5:
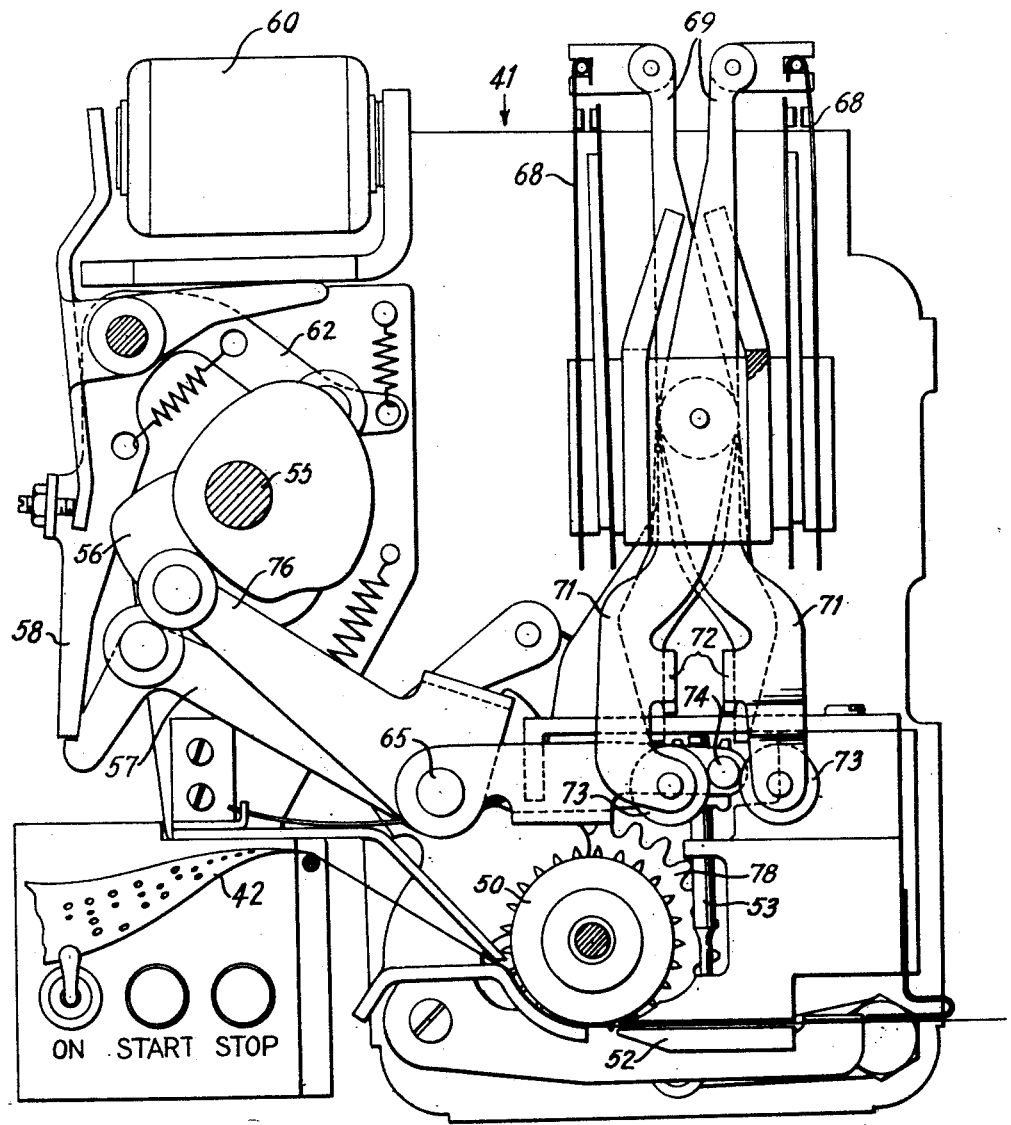
Fig. 5 is a plan section view of the tape reader unit, illustrating the general arrangement of parts therein.
Figure 6:
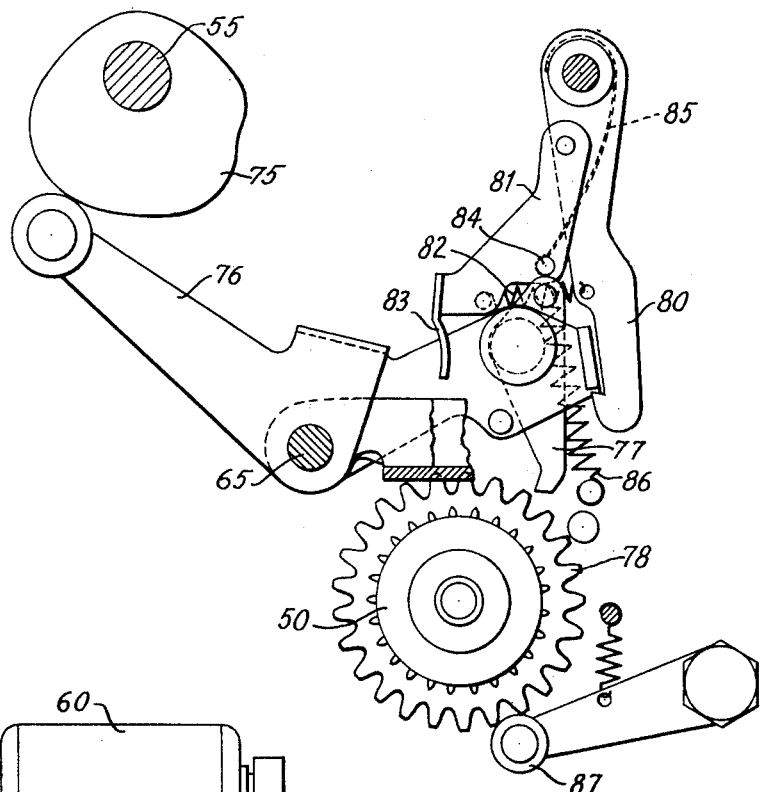
Fig. 6 is another plan sectional view of the tape reader unit, illustrating certain details of the tape feeding mechanism.
Figure 8:
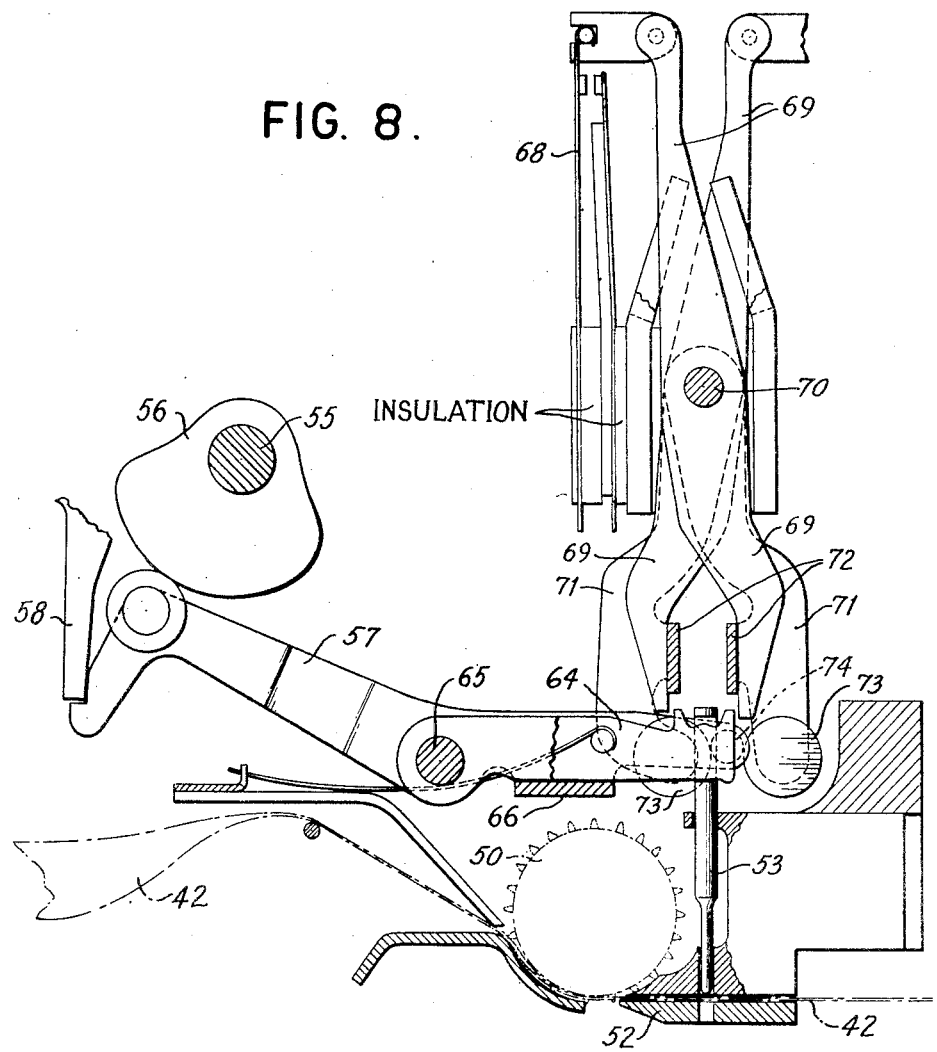
Fig. 8 is a plan sectional view showing the tape sensing mechanism of the tape reader unit.

The tape reader 41 (Fig. 1) is adapted to feed the control tape 42 step by step while consecutively reading the code designations perforated in said tape. Referring to Figs. 5, 6 and 8, the tape reader 41 has a sprocket or pin wheel 50, the pins of which are adapted to project through feed holes 51 (Fig. 3) perforated in the tape 42 at regular intervals. The tape 42 is guided past a die plate 52 having holes therein aligned respectively with a series of sensing pins 53 (only one of which is illustrated here). As many sensing pins 53 are provided as there are index rows in the tape 42. Since in the present instance the tape 42 has five index rows in which code perforations may be formed, it is necessary to utilize five sensing pins 53. Preferably, the tape reader is constructed with a number of sensing pins equal to the maximum number of index rows that may be used in the tape. Thus, if the tape reader is likely to be used in a machine that operates under the control of an eight-hole tape, eight sensing pins 53 are provided. When the tape reader is being used in a machine controlled by a five-hole tape, only five of these sensing pins need be utilized.

Figure 7:
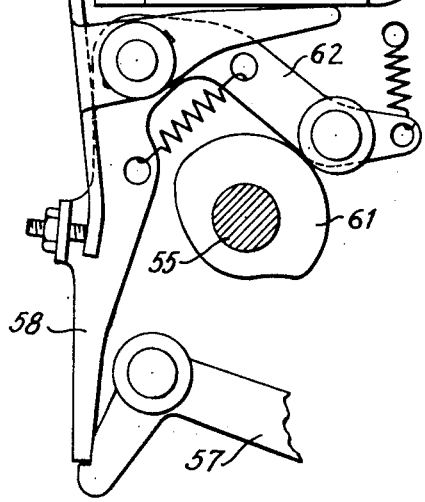
Fig. 7 is a detail view of the tape reader control magnet and its associated parts.

The tape reader 41 has a cam shaft 55 (Figs. 5 to 8) which rotates continuously while the tape reader is operated, and on this shaft 55 are mounted various cams which control the feeding and sensing of the tape. The cam 56 which controls the sensing of the tape is shown best in Fig. 8. This cam 56 is associated with a follower 57 that normally is not free to follow the contour of the cam 56 because of a latch 58 which restrains the follower 57. The latch 58 is controlled by an electromagnet 60 (Figs. 5 and 7), to the armature of which it is yieldably connected. When the magnet 60 is energized, the latch 58 is withdrawn from the follower 57, permitting the latter to follow the cam 56. The magnet 60 is energized each time that a code designation is to be sensed in the tape. When the magnet 60 is deenergized, the latch 58 is restored into engagement with the follower 57 and assumes the position shown in Figs. 5, 7 and 8 when the follower 57 rides onto the high portion of the cam 56. An armature knock-off cam 61 (Fig. 7) on the cam shaft 55 cooperates with a follower 62 formed on the latch lever 58 to insure that the armature of the magnet 60 is not held against the magnet core by residual magnetism.

Each sensing pin 53 is associated with an interposer 64 pivotally mounted on a shaft 65 which serves also as a fulcrum for the follower 57. Each interposer 64 is received in a slot formed in the upper end of the associated sensing pin 53. The interposers 64 normally are held in their extreme retracted positions (Fig. 8) by a bail 66 formed on the cam follower 57, thereby holding the sensing pins 53 away from the tape 42. When the cam follower 57 is released to travel onto the low portion of the cam 56 the bail 66 is withdrawn from the interposers 64, whereupon the interposers 64 and the sensing pins 53 are urged under slight spring pressure toward the tape 42. Those pins 53 which find perforations in the tape pass through said perforations, while the pins 53 which encounter the blank tape are prevented from further movement, leaving their interposers substantially in their initial positions.

Electric contacts 68 (Figs. 5 and 8) are arranged to be actuated individually by sensing levers 69 arranged in scissors fashion on a pivot shaft 70. The sensing levers 69 are urged by the springs of the contacts 68 toward complementary projections on the respective interposers 64. Normally, a pair of bails 72 carried by operating levers 71 restrain the sensing levers 69 against such movement. The operating levers 71 carry rollers 73 so positioned as to straddle pins 74 located on the free ends of the cam follower 57. The pins 74 normally keep the rollers 73 separated, thereby holding the bails 72 in their outer positions, as shown.

When the follower 57 moves to release the sensing pins 53 and interposers 64, the same action causes the pins 74 to move from between rollers 73. The scissors-like operating levers 71 thereupon move toward each other, and the sensing levers 69 (under the influence of their contacts 68) tend to follow the bails 72. Wherever a sensing pin 53 has penetrated a hole in the tape 42, the associated interposer 64 will have moved out of the path of the sensing lever 69, permitting the contacts 68 acting upon such lever to close. However, if a sensing pin 53 has not entered a perforation in the tape, the interposer 64 will block the swinging movement of the aligned sensing lever 69, thereby holding the corresponding contact 68 open. Hence, the tape sensing contacts 68 close or remain open according to whether their sensing pins 53 find perforations or blank spots in the tape. This arrangement enables the contact 68 to be closed in accordance with the code perforations in the tape without subjecting the sensing pins 53 to the pressure of the contact springs.

A tape feeding cam 75 (Figs. 5 and 6) on the cam shaft 55 has a follower 76 on which a feed pawl 77 is pivotally mounted. When the cam follower 76 is on the high portion of the cam 75, the feed pawl 77 is retracted from a feed ratchet wheel 78 (Fig. 6). A latch 80 acting upon follower 76 retains the feed pawl 77 in this position while the tape is being sensed by the pins 53. A lever 81 pivotally mounted on the latch 80 is connected also by a coil spring 82 to the latch 80, with the spring 82 tending to draw these two parts together like scissors blades. The lever 81, however, has an extension 83 that cooperates with the sensing lever assembly 69—71 (Fig. 5), and the lever 81 is thereby prevented from shifting to the right as viewed in Fig. 6 until the lever assembly 69—71 is released during a tape sensing operation. Then, the lever 81 moves to the right until a pin 84 thereon engages the latch 80. The hooked end of the latch 80 remains engaged with the mating part of the lever of the cam follower 76 until the extreme high point of the cam 75 engages the follower 76 to afford clearance. Thereupon a leaf spring 85 acting upon the pin 84 urges the lever 81 and latch 80 farther to the right. The follower 76 is released from the latch 80, and a spring 86 pulls the pawl 77 toward the ratchet wheel 78. Before the pawl 77 actually engages and commences to rotate the ratchet wheel 78, the sensing pins 53 will have been restored. Thereupon the lever 81 is swung to the left (Fig. 6) pulling the latch 80 along with it, but without effect at present since the follower 76 has already been released from the latch 80. The spring-urged pawl 77 rotates the ratchet wheel 78 through a small arc, thereby causing the pin wheel 50 to move through a corresponding arc to advance the tape one step. A detent roller 87 cooperates with the ratchet wheel 78 for an obvious purpose. When the follower 76 again rides onto the high portion of the cam 75, the latch 80 is in position to retain the follower 76 as it retracts the pawl 77 from the ratchet wheel 78.

The above description sets forth such details of the tape reader as are considered desirable for an adequate understanding of the invention. A more complete disclosure of said tape reader is made in the copending application of E. O. Blodgett, Serial No. 173,320, filed July 12, 1950, which application was issued on November 25, 1952, as Patent No. 2,619,532, wherein said tape reader is claimed specifically. For the purpose of the present invention, any equivalent tape reader may be employed.

Card punch unit

Figure 9:
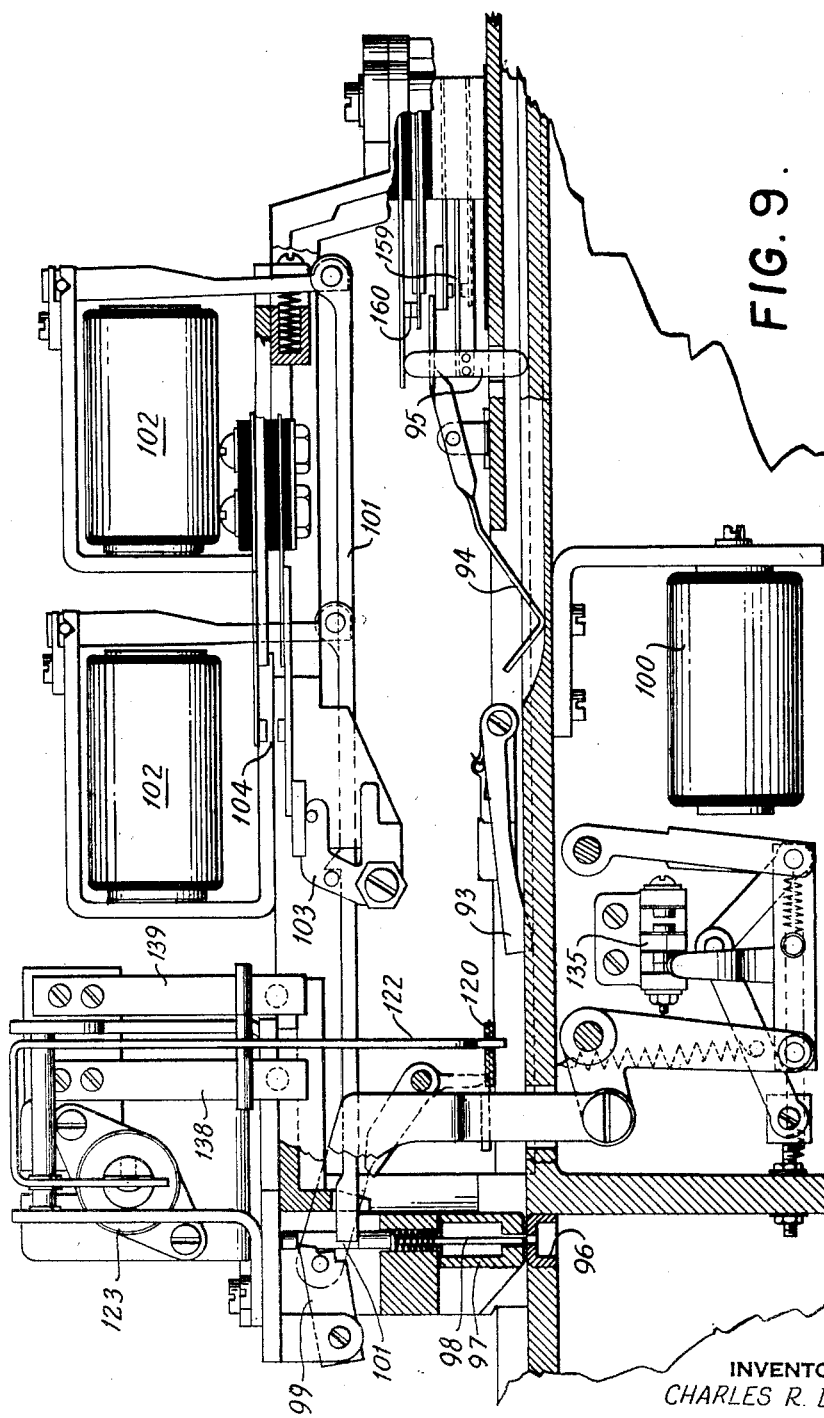
Fig. 9 is a fragmentary vertical section illustrating the main portion of the card punch unit.
Figure 10:
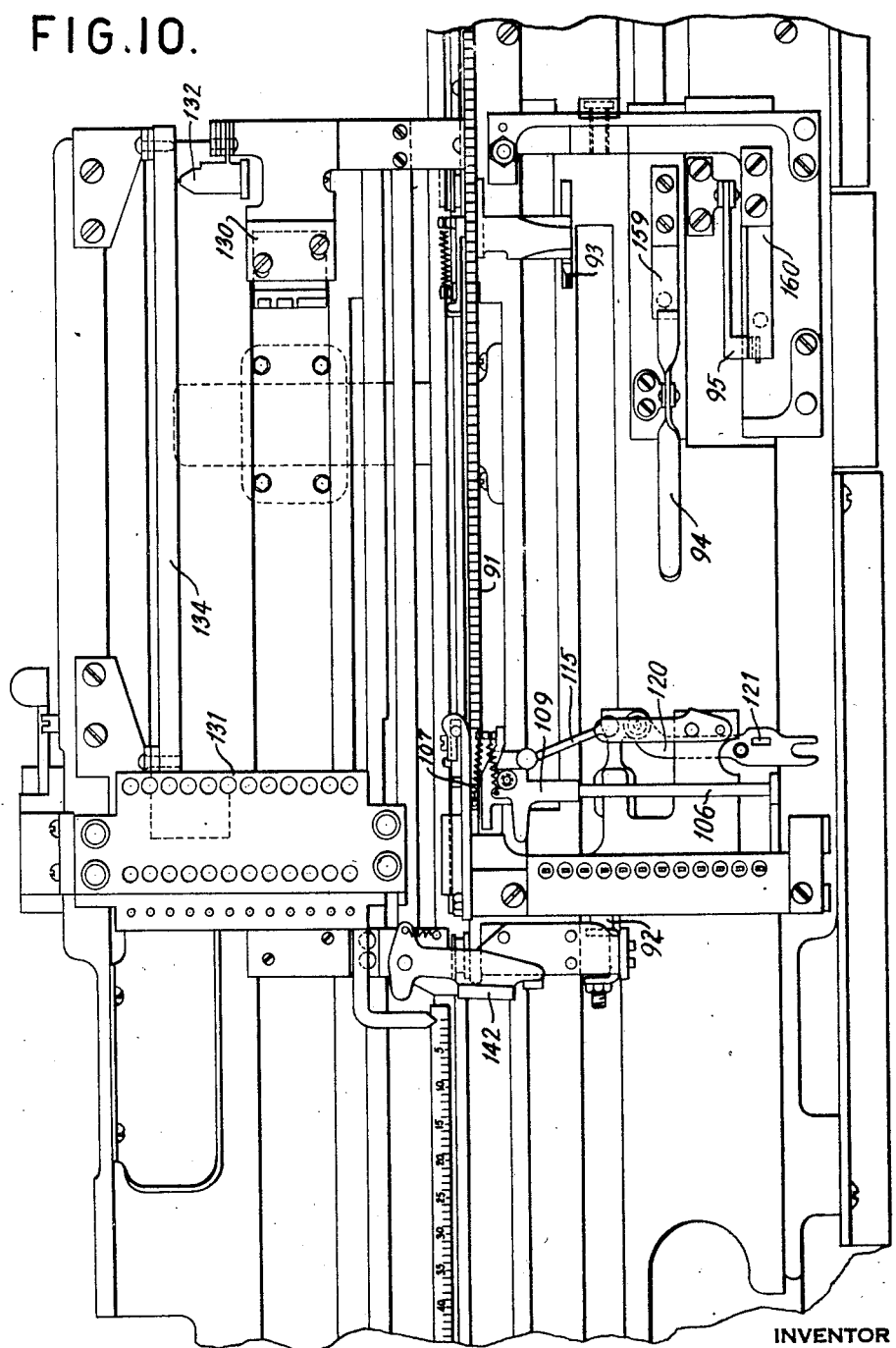
Fig. 10 is a fragmentary plan view of the card punch unit, omitting those parts of the structure which would obscure the bed and carriage mechanism.

The card punch unit 40 (Fig. 1) is illustrated specifically in Figs. 9, 10 and 11. This punch unit resembles the punch disclosed in the U. S. patent to Brand and Cunningham, No. 2,333,461, except that it uses an improved skip mechanism of the character disclosed in the copending application of Brand and Cunningham, Serial No. 656,045, filed March 21, 1946, said application having been issued on September 4, 1951, as Patent No. 2,566,920.

Blank cards are fed successively from a card hopper 90 (Fig. 1) to a card carriage which conveys each card step by step through a punching position at which a column of punches is arranged to operate upon each card column in turn during normal punching operations. This card carriage also is adapted to skip over any selected number of column steps when such action is desired.

The card carriage comprises a rack 91 (Figs. 10 and 11) from which extend a card stop 92 at the leading end of the card and a card pusher 93 at the trailing end of the card. As each new card is fed from the hopper, it passes beneath a card lever 94 (Figs. 9 and 10) and a first column lever 95. These levers respectively control contacts 159 and 160 which perform well-known functions for insuring that the machine operation is stopped if a card fails to feed from the hopper or reach the first column position. The card passes under the pusher 93 until it engages the stop 92 on the carraige, whereupon the pusher 93 drops behind the trailing edge of the card.

The carriage 91 advances the card column by column through punching position, and after the card is completely punched and ejected, the carriage 91 returns to receive a new card. The punching position is defined by a die 96 and a stripper 97 (Fig. 9), between which the card is inserted. A column of twelve punches 98 in the stripper 97 is aligned with a corresponding series of holes in the die 96. The punch mechanism is of well-known construction. A motor bar 99 common to all of the punches 98 is connected by a linkage as shown in Fig. 9 to the armature of a punch magnet 100. Whenever the magnet 100 is energized, the motor bar 99 is driven downwardly. Whether or not each individual punch 98 is actuated by the bar 99 depends upon whether a related interposer 101 is moved between the head of the punch 98 and the punch actuating portion of the motor bar 99. A separate interposer 101 is provided for each punch, and each interposer is controlled by an interposer magnet 102. Whenever a magnet 102 is energized, it shifts its interposer 101 to select the corresponding punch 98 for operation. Such shifting of the interposer also rocks a common interposer bail 103 to close an interposer contact 104, which thereupon completes a circuit to the punch magnet 100. The latter magnet, in energizing, causes the selected punches 98 to be driven through the card.

The escapement mechanism, illustrated in Figs. 11 and 13, includes a dog 105 that normally engages the upper edge of the rack 91, as shown in Fig. 11, and a dog 110 which normally is disengaged from said rack. The dog 105 is pivoted on the rod 106 and has an elongated pivot slot. When dog 105 is engaged with the rack 91, the force of the spring acting on the rack 91 forces the dog 105 to one side of its slot against the action of a spring 107. The dog 110 is pivoted at 111 and, unlike the dog 105, is not capable of shifting back and forth. A rocker 109 pivoted on the rod 106 has, on the opposite sides thereof, pins 112 and 113 which respectively extend into slots in the dogs 105 and 110.

When the rack 91 is to be advanced one column position, the rocker 109 is first actuated clockwise, as viewed in Fig. 13. This causes the dog 105 to be retracted from the rack 91, while bringing the dog 110 into engagement with said rack. This produces only an imperceptible advance of the rack 91. When the dog 105 is disengaged from the rack 91, its spring 107 shifts the dog 105, bringing the end of the dog 105 adjacent the next tooth of the rack 91. Then, when the rocker 109 is moved back into its original position, and the dog 110 is lifted from the rack 91, the rack 91 moves ahead until the clearance in the pivot opening of the dog 105 is again taken up. This brings the next succeeding card column under the punches.

The rocker 109 is automatically actuated by means of a space bar (not shown) each time the motor bar 99 (Fig. 9) of the punch unit descends and returns again to its upper position. Hence, the card carriage is stepped ahead one column position as an incident to each column punching operation.

For causing the card carriage to skip more than one column at a time, there is provided a skip lifter 115 (Figs. 10 and 13) which projects horizontally beneath the dog 105. The end of the skip lifter 115 has an inclined cam edge which is adapted to ride over a lever 116 pivoted at 117. A spring-pressed plunger 118 bears upon one end of the lever 116 to take up the clearance between a stud 119 and an enlarged opening in the lever 116 through which the stud extends.

The skip lifter 115 is adapted to be actuated by a toggle mechanism including a lever 120 (Fig. 10). This lever has a slot 121 therein which receives the lower end of a rock lever 122 (Fig. 9) connected to the armature of a skip magnet 123 mounted on the frame of the punch unit. When the magnet 123 is operated, the rock lever 122 pushes the toggle lever 120 and causes the skip lifter 115 to shift. Skip magnet 123, in energizing, also closes a contact 138 (Fig. 9) which causes the punch magnet 100 to operate. The operation of the punch magnet 100 causes dog 105 to be lifted from the rack 91. Then, as the magnet 100 is restored, the dog 105 is held in its elavted position by the skip lifter 115, which meantime has been cammed upwardly while shifting across the lever 116. With both of the dogs 105 and 110 being free of the rack 91, the card carriage starts to skip.

Skipping movement is halted by causing the dog 105 to re-engage the rack 91 notwithstanding the position of the skip lifter 115. To this end, a skip bar 125 (Figs. 11 and 13) is secured to the rack 91, and a skip stop insert 126 is placed in the bar 125 at the column position where skipping is to stop. When a skip stop insert 126 encounters the nose of the lever 116, the lever 116 is tilted against the action of its plunger 118 dropping the skip lifter 115 and restoring the dog 105 into engagement with the rack 91, thus arresting the card carriage.

The master card (if one is used) is mounted on a carriage 130 (Fig. 10) connected to the card carriage rack 91. The master card remains on this carriage and is not automatically ejected as are the other cards. As the card which is being perforated moves through the punching position, the master card is advanced through a reading device 131. Inasmuch as the master card reading apparatus is well known, no further description of the same is presented herein.

Mounted on the master card carriage 130 is an emitter brush unit 132 (Figs. 10 and 12) that cooperates with column-representing contacts 133 on an emitter panel 134. The brush unit 132 cooperates successively with the various contacts 133 in step with the advance of the card through the punching position. This activates in sequence the various card column hubs illustrated in Fig. 14.

Punch magnet armature contacts 135 (Fig. 9) are mounted to cooperate with the mechanism controlled by the punch magnet 100. Each time the armature of the magnet 100 is actuated, the contacts 135 change their positions. The function of these contacts will be brought out more fully hereinafter.

An escapement contact 136 (Fig. 11) is operated by the dog 105, this contact 136 being opened each time that the dog 105 is lifted to release the card carriage rack. This escapement contact controls various circuits in the machine to which reference will be made hereinafter.

A pair of skip contacts 138 and 139 is operated by the rock lever 122 of the skip mechanism. The function of skip contact 138 has been previously explained. Skip contact 139 serves to hold a skip control circuit (hereinafter described) closed so long as the skip magnet 123 remains energized.

A column cutout contact 140 (Fig. 11) is arranged to be operated by a bail 141 extending parallel to the path of the card carriage. A thumb lever 142 on the card carriage has a depending pin 143 cooperating with the bail 141, permitting the column cutout contact 140 to be manually operated by means of the thumb lever 142 for any position of the card carriage. This contact is used to stop the tape reader or to interrupt the duplication of information from the master card in order that information can be punched in the card under control of the manual keyboard.

*Operation*

The operation of the machine will be described first with reference to the general wiring diagram (Figs. 17a to 17j), and then with reference to the supplemental circuit diagrams (Figs. 18 to 30), the latter being simplified versions of the general wiring diagram to illustrate specific functions of the machine.

Assuming that the hopper 90 (Fig. 1) has been filled with a supply of blank cards and that the main line switch has been turned on, the first step in the operation is to depress the release switch 150 or the reelase key 151 (Fig. 15c), one of these being located on the machine proper (switch panel 153, Fig. 1) and the other being in the keyboard unit 43. This closes a circuit for picking up a release relay R8. Relay R8 is held through motor contact No. 1 (Fig. 15b), and at the same time a relay R22 (Fig. 15c) is picked up. As an incident to these operations, the skip start relay R9 is energized, and this in turn causes the skip magnet 123 (Figs. 9 and 15c) to be energized in the manner explained above. The skip magnet, in energizing, closes its contacts 138 and 139, and this causes the punch magnet 100 (Fig. 15b) and a skip control relay R10 (Fig. 15d) to energize. When punch magnet 100 is energized, skipping commences. Normally the skip control relay R10 would stop the skip when a skip stop was encountered, but in the present instance it has no effect. The card carriage (empty at this time) therefore moves rapidly into its last-column position, thereupon closing the usual "last column" contact 154 (Fig. 15a). This results in the energization of a last-column relay R4 (Fig. 15b), which in turn causes an eject magnet 155 to energize. The eject magnet, as is well known, operates to swing the eject jaws, which normally has the effect of removing the card from the carriage and placing the same in a stacker box 156 (Fig. 1). In the present instance, such movement of the eject jaws merely serves to close an auto start contact 157 for energizing a trip magnet 158. The trip magnet reverses the positions of motor contact No. 1 (Fig. 15b) and motor contact No. 2 (Fig. 15a). Contact No. 1 opening, drops out the release relay R8 and the relay R22. Motor contact No. 2, in closing, starts the punch drive motor. As a result of the foregoing actions, the card carriage returns to its initial position and the first card is fed from the hopper to the carriage, coming to rest in the No. 1 column punching position.

With a card at the first-column position, the punch card lever contact 159 and the first column contact 160 (Fig. 15e) are closed as is also a card lever contact 161 in the hopper or magazine. Hence, when motor contact No. 1 (Fig. 15b) again closes (after the initial card feeding step is completed), a start control relay R19 is energized. This conditions the machine for automatic operation.

To start the automatic operation, the operator depresses a start key 162 (Fig. 15e), and when the circuit breaker C3 closes its contact, a start relay R20 is picked up. Relay R20 is held through a circuit including a stop key 163 and a tape reader motor switch 164. Hence, the operation of the machine continues automatically, as long as the supply of cards lasts, unless the operator opens the stop switch 163 or the tape reader motor switch 164. Automatic starting and stopping of the machine independently of the operator is under the control of the start control relay R19.

From this point on, the operations that take place depend upon the control panel wiring. As mentioned above, many varied operations may be performed by the machine, depending upon the manner in which the control panel is wired. In the sections of the description which follow, a number of specific circuits will be considered in relation to the various plughubs on the control panel.

*Tape reader control (from card columns)—Fig. 18*

Tape reading is initiated by an impulse to the "Tape Read On" hubs. For example, assume that tape reading is to commence when the card is in its first column position. Plugwire 165 (Fig. 18) is used to connect the "Tape Read On" hubs to the No. 1 card column hubs. Then, when the emitter is in its No. 1 position, a circuit is established through motor contact No. 1, "a" contact of escape relay 23, "c" contact of release relay 22, column emitter, column No. 1 hub, plugwire 165, "Tape Read On" hub, "b" contact of start relay 20, "d" contact of start control relay 19, "a" contact of "Tape Read Off" relay R7, "a" contact of "Non-Check" relay R5 to the pickup coil of the "Tape Read On" relay R6. A holding circuit for relay R6 is established through motor contact No. 1, the "c" contacts of "Duplicate On" relay R17, start control relay R19, start relay R20, skip start relay R9, release relay R8, "Tape Read Off" relay R7 and "Space" relay R5, and "b" contact of relay R6 to the hold coil of R6.

When the circuit breaker C-4 closes, a circuit is established through motor contact No. 1, escapement contact 136, column cutout contact 140, "c" contact of last column relay R4, "a" contact (now closed) of "Tape Read On" relay R6 and circuit breaker C-4 to the tape reader control magnet 60. This energizes the magnet 60 to effect a tape sensing operation in which the first code designation in the tape is read. The circuits which are established in response to the reading of the code designations will be considered in detail hereinafter.

Where the card is being punched under control of the tape through the 80th card column, provision is made to interrupt the tape reader automatically when the card passes its 80th column position. Thus, as the last-column contact (Fig. 17a) closes, the last-column relay R4 energizes, and the "c" contact of the last-column relay R4 (Fig. 18) opens to deenergize the magnet 60.

If the tape reading operation is to be interrupted when the card reaches a desired intermediate position, a plugwire 166 (Fig. 18) is employed to connect the "Tape Read Off" hubs to the hubs of the card column at which tape reading is to stop. (In the present instance this is shown as a direct connection for simplicity, but the connection can be made also through intermediate devices such as distributors or selectors.) When the punch magnet relay R3 energizes as an incident to the punching of the last active column, the "a" contact thereof closes a circuit through the column emitter and plugwire 166 to the "Tape Read Off" relay R7. As R7 energizes, it opens its contacts "a" and "c," causing the "Tape Read On" relay R6 to deenergize. Thereafter, the relay R6 remains deenergized until such time as the column emitter reaches a card column hub which is wired to the "Tape Read On" hubs.

*Other forms of tape reader control*

The tape reader can, if desired, be controlled by impulses from exit hubs other than the card column hubs. Any of the tape character hubs, for instance, can furnish the required impulses whereby the reading of the tape is started or stopped, as the case may be, in response to the sensing of a particular tape code designation. Similarly, impulses from the column code hubs can control the tape reader. In either case, the operation is similar to that just described. Appropriate control panel connections are made from the tape reader control hubs to the controlling exit hubs on the control panel, and the various relay circuits operate as before to effect the reading of the tape by the tape reader.

Tape reader exit impulses

Certain hubs designated "Tape Reader" or "TR" (Fig. 18 and 14) emit an impulse following each code read from the tape. The circuit for this purpose is traced through motor contact No. 1, "b" contact of start control relay 19, circuit breaker C-1, "a" contact of "Tape Read On" relay R6 to the tape reader hubs. Thus furnishes an impulse each time the circuit breaker C-1 closes.

Figure 21:
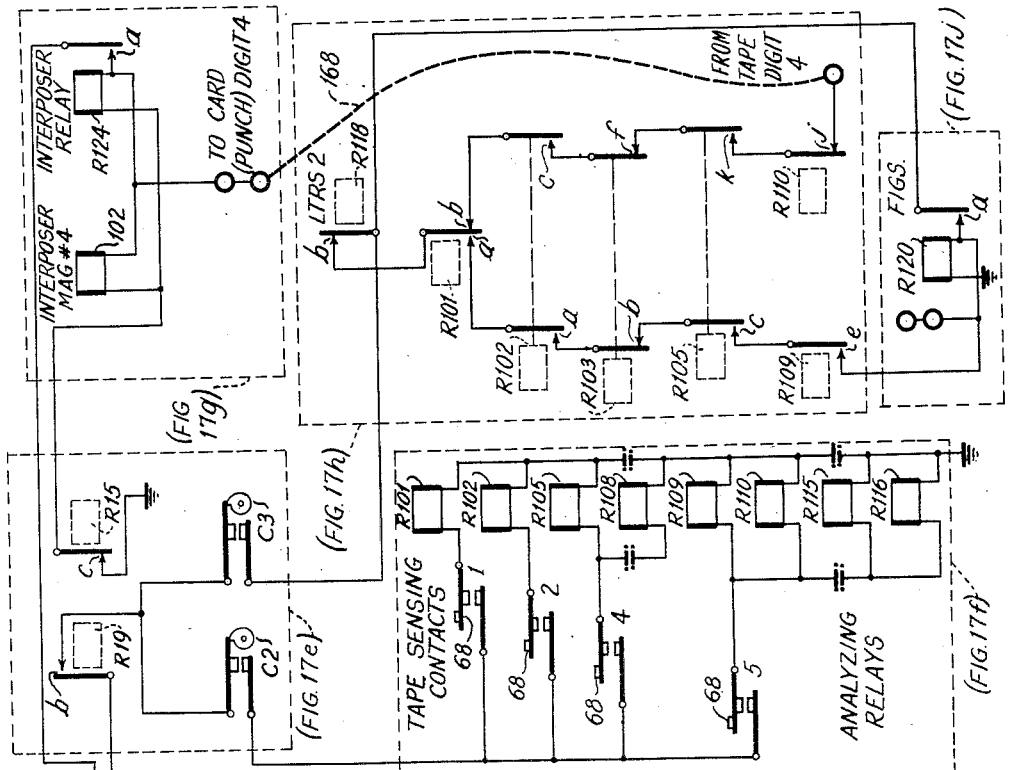

Punching numerical information from tape—Fig. 21

It will be assumed, by way of example, that a figures-shift code followed by a digit 4 code is read from the tape. This should result in the punching of a digit 4 code in the corresponding card column.

The figures-shift code consists of perforations in the 1, 2, 4 and 5 index positions on the tape. As these perforations are sensed, the corresponding tape sensing contacts 68 are closed. When the circuit breaker C-2 (Fig. 21) closes, a circuit is established through motor contact No. 1, "b" contact of start control relay R19, circuit breaker C-2, and tape sensing contacts 68 to the analyzing relays R101, R102, and R105 to R116 inclusive. The analyzing relays shift their various contacts to establish a circuit appropriate to the figures-shift code. This circuit may be traced as follows:

Motor contact No. 1, "d" contact of start control relay R19, circuit breaker C-3 (when closed), "b" contact of the "Letters 2" relay R118 (de-energized during numerical operations), and the appropriate contacts of the analyzing relays R101, R102, R103, R105 and R109 to the "Figures" relay R120. Relay R120 thereupon energizes and closes its "a" contact to establish a holding circuit which is maintained as long as the contact C-3 is closed. As an incident to the energization of R120, an impulse is emitted from the "FIGS" hubs (Figs. 21 and 14) on the control panel. It should be noted that the card carriage does not escape to the next step inasmuch as no punching operation was performed in response to the figures-shift code.

The digit 4 is represented by perforations in the No. 2 and No. 4 index positions on the control tape. Hence, when this code is sensed, the tape sensing contacts 68 in the Nos. 2 and 4 positions are closed, causing the analyzing relays R102 and R105 to R108 to become energized. This establishes a circuit through the contacts of analyzing relays R101, R102, R103, R105 and R110 to the digit 4 hub in the tape character group. The impulses emitted from this hub are routed through a plugwire 168 on the control panel to the digit 4 hub in the card punch group. (It will be recalled that in the case of digit-for-digit punching, the correspondingly numbered digit hubs in these two groups are interconnected.) Consequently, the interposer relay R124 and the interposer magnet 102 corresponding to the digit 4 are operated. The interposer relay R124, in closing its "a" contact, establishes a holding circuit for the interposer magnet 102 and for itself, until such time as the card carriage escapes or is released following the punching of the digit 4. Punching takes place in the well-known manner (explained hereinabove) when the interposer magnet 102 is operated.

Punching alphabetic information from tape—Fig. 23

Alphabetic characters are preceded by the "Letters" code designation in the tape, consisting of perforations in all five index positions. Under these circumstances, all five of the tape sensing contacts 68 are closed, causing all of the analyzing relays to be energized. When C-3 closes, the circuit is extended through the "b" contact of "Letters 2" relay R118 and through the "a" contacts of analyzing relays R101, R102, R103, R105 and R109 to the "Letters 1" relay R119. R119 is held momentarily through a holding circuit (shown in Fig. 17h), and is then released. During the interval while R119 is energized, the "Letters 2" relay R118 becomes energized, the circuit being established through C-1, and the "b" and "c" contacts (in parallel) of R119 to the pickup coil of R118. R118 is held through the normally closed contacts "b" and "c" of the "Figures" relay R120 until such time as a figures-shift code is encountered in the tape.

It will be assumed that the letter R is represented in the tape by perforations in the 2 and 4 index positions, preceded by the letters-shift code. Appropriate circuits are closed through the tape sensing contacts 68 for energizing the analyzing relays R102 and R105 to R108. Without tracing the circuit paths through the analyzing relay contacts in detail, circuits are closed through the "b" and "C" contacts of R118 and through the analyzing relay contacts shown in Figs. 17i, 17j and 23 to the interposer relays R129 and R131 and the interposer magnets 102 for the digits 9 and 11. The combination of a "9" hole and an "11" hole punched in the same card column signifies the letter R. Punching is effected by the operation of the interposers in the familiar manner.

Each succeeding code is punched as a letter until such time as a figures-shift code is encountered in the tape, as previously explained. The relay R119, which energizes whenever a letters-shift code is sensed, has a "d" contact which, in closing, activates the "Letters" (LTRS) hubs to emit an impulse that may be used for control purposes.

Normal release and non-check—Fig. 24

The machine can be wired for automatically checking the positions of the card and tape against each other at the end of the punching operation to insure that they are in step with each other. If the card is being punched to the 80th column, the column 81 hub of the emitter is connected by a plugwire 170 (Fig. 24) to a selector pickup hub, for example, the pickup hub of the selector relay R149. If the card is not being punched as far as the 80th column, the plugwire connection is made from the hub of the column following the last column punched to the selector pickup hub. The common (C) hub of this selector is connected by a plugwire 171 to the carriage return (CR) hub in the tape character group. The normal (N) hub of the selector R149 is connected by a plugwire 172 to the "Non-Check" hub. This insures that the "Non-Check" relay R5 will become energized if the CR code is read from the tape before the selector R149 is picked up at the final card column. If the card and tape are in proper step with each other at the final column, the card may be released. To this end a plugwire connection 173 is established from the transferred (T) hub of the selector R149 to the release hub.

At the beginning of the card punching operation, the "Tape Read On" relay R6 is picked up and held through circuits indicated in Fig. 24 and explained hereinabove. Punching then proceeds in column-by-column fashion. When the column following the last punched column is reached, an impulse is sent from the emitter through the plugwire 170 to the selector relay R149. Selector R149 thereupon transfers its contacts. Assuming that the card is in step with the tape at this time, a CR code (perforation in No. 4 index position) is read from the tape, closing a circuit through C-2 and No. 4 tape sensing contact 68 to the analyzing relays R105 to R108. When C-3 closes, a circuit is established through contacts of the analyzing relays R101, R102, R103, R106 and R111, as shown, to the CR hubs. An impulse therefore is sent through plugwire 171, selector C hub, transfer selector contacts, selector T hub, plugwire 173, release hub, "a" contact of "Duplicate On" relay R18 (normally closed) to the pickup side of the release relay R8. R8 is held through motor contact No. 1, column cutout contact 140 and "b" contact of R8 at the relay R22 is energized. Release relay R8, in energizing, opens its "c" contact and breaks the holding circuit for the "Tape Read On" relay R6, thereby interrupting the tape reading operation.

It is assumed in the present instance that the release is being effected from the column 81 position of the card, in which case the last-column contact 154 is closed and the last-column relay R4 is energized. If release is being effected from an intermediate position of the card, under which condition the last-column relay R4 would be deenergized, energization of R8 would close a circuit through the "a" contact of R4 (Fig. 17c) and the "d" contact of R8 to a skip start relay R9. This would initiate a skip of the card carriage to its extreme or last-column position.

With the card carriage in last-column position, and R8 energized, a circuit is closed through last-column contact 154 (Fig. 24) and "a" contact of R8 to the eject magnet 155. The card thereupon is swung from the punch bed to the stacker by the eject jaws. At the same time, an impulse is sent through the "a" contact of relay R22 to the eject hub on the control panel, signifying the ejection of a card. As the eject jaws swing over, they close an auto-start contact to energize the trip magnet 150, whereupon the card carriage is restored to its initial position and a new card is fed.

If the CR or carriage return impulse is emitted before the card reaches the column following the last column punched, the impulse travels through C and N terminals of selector R149, plugwire 172, "Non-Check" hub and "d" contact of R22 to the pickup coil of "Non-Check" relay R5. "Non-Check" relay R5 is held through motor contact No. 1 and its own "b" contact. "Non-Check" relay R5 opens its "a" and "c" contacts, thereby causing the "Tape Read On" relay R6 to release and remain deenergized. Hence, no further tape reading operations can occur, and the operation of the machine is suspended until a new card has been fed in to replace the incorrectly punched card.

Another faulty condition which may occur is that the card will reach its last-column position before the CR code is read from the tape. In this event a circuit is closed through C-3, "a" contact of R4 (now closed), and through the "b" contact of an interposer relay such as R121 (assuming that a digit 1 is being punched after the last column has already been punched) to the pickup side of the "Non-Check" relay R5. Each of the interposer relays R121 to R132 (Fig. 17b) has a "b" contact such as the one associated with R121 (Fig. 24). Hence, if the machine attempts to punch any character in the card when the card already has attained its last-column position, a circuit will be closed for picking up R5. The effect of this is to interrupt the tape reading and suspend machine operation until the condition is rectified.

When a non-check condition develops, the tape must be backed up to the point where the punching of the card commenced. A new card then is fed in, and if the punching progresses in a normal fashion the old card may be discarded and the machine continued in operation. If a second non-check occurs, this indicates that the tape is improperly punched and should be corrected.

Selector hold

Figure 17:
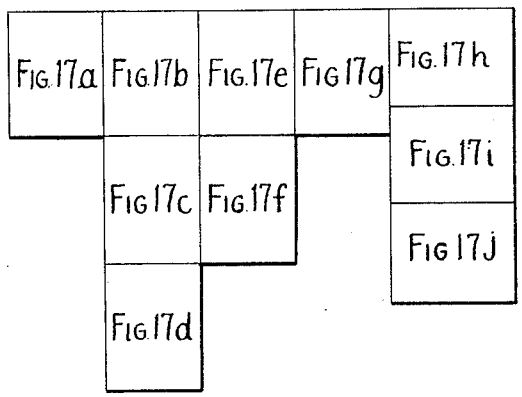
Figure 17B:
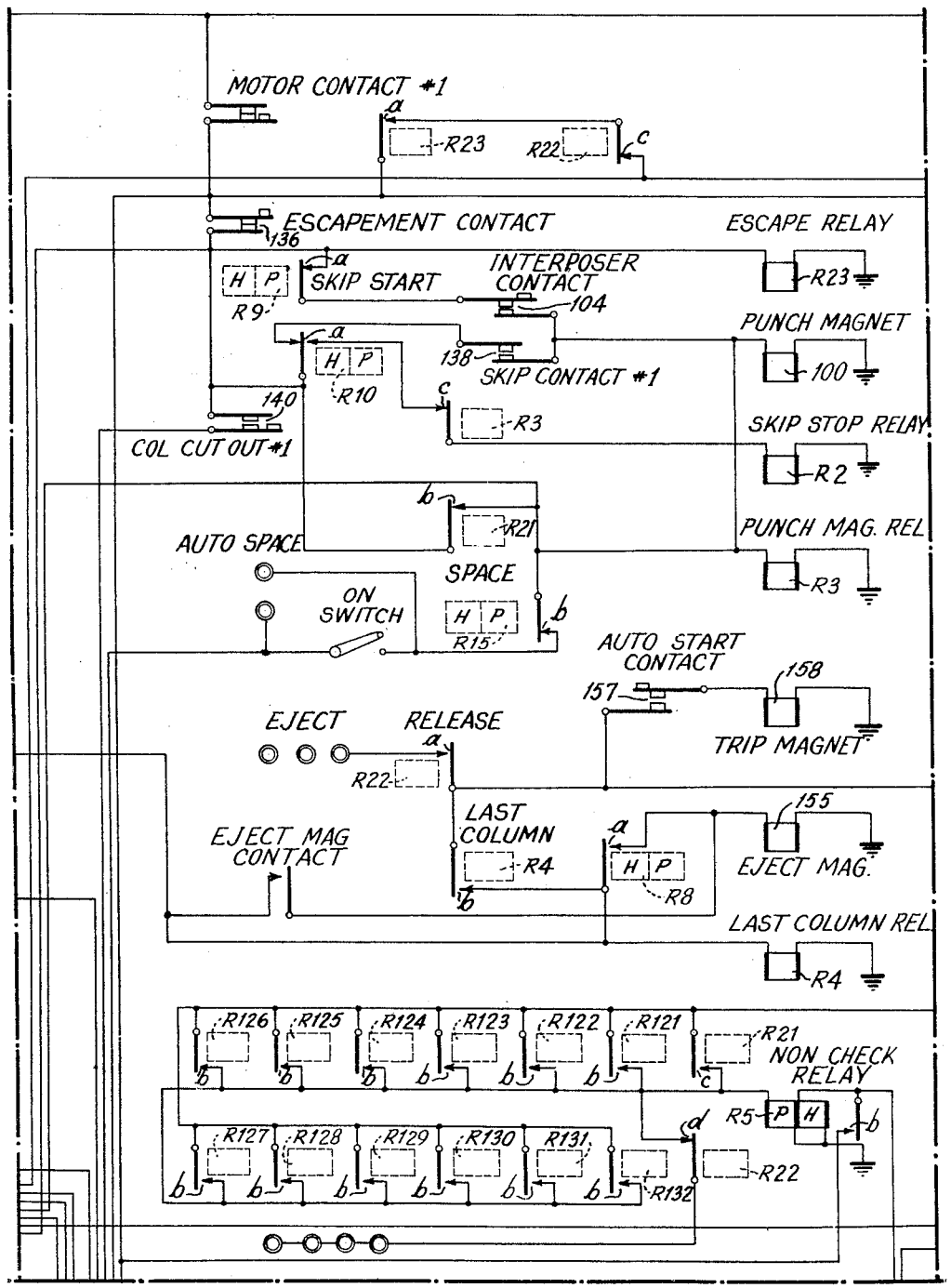
Figure 17C:
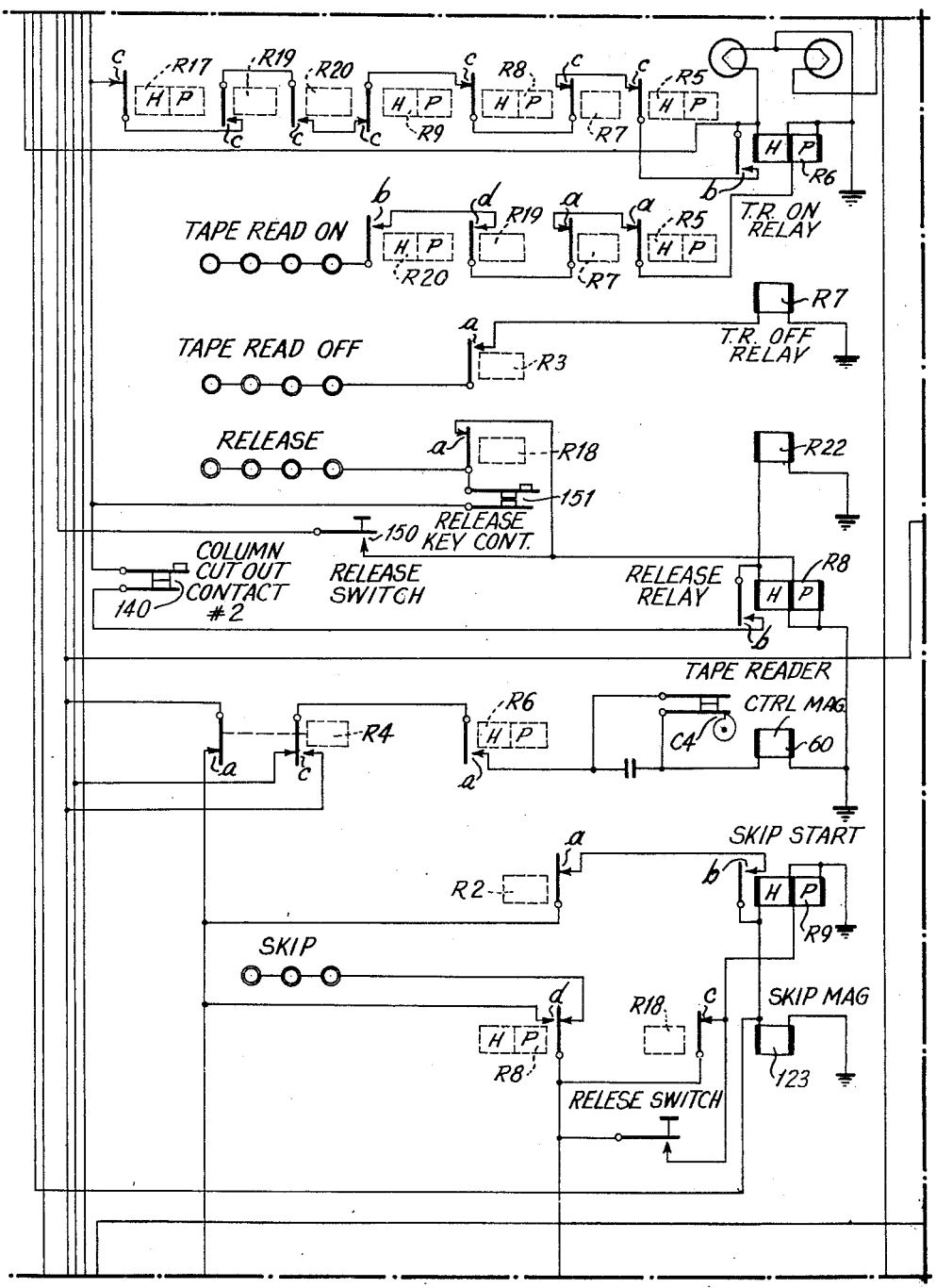
Figure 17D:
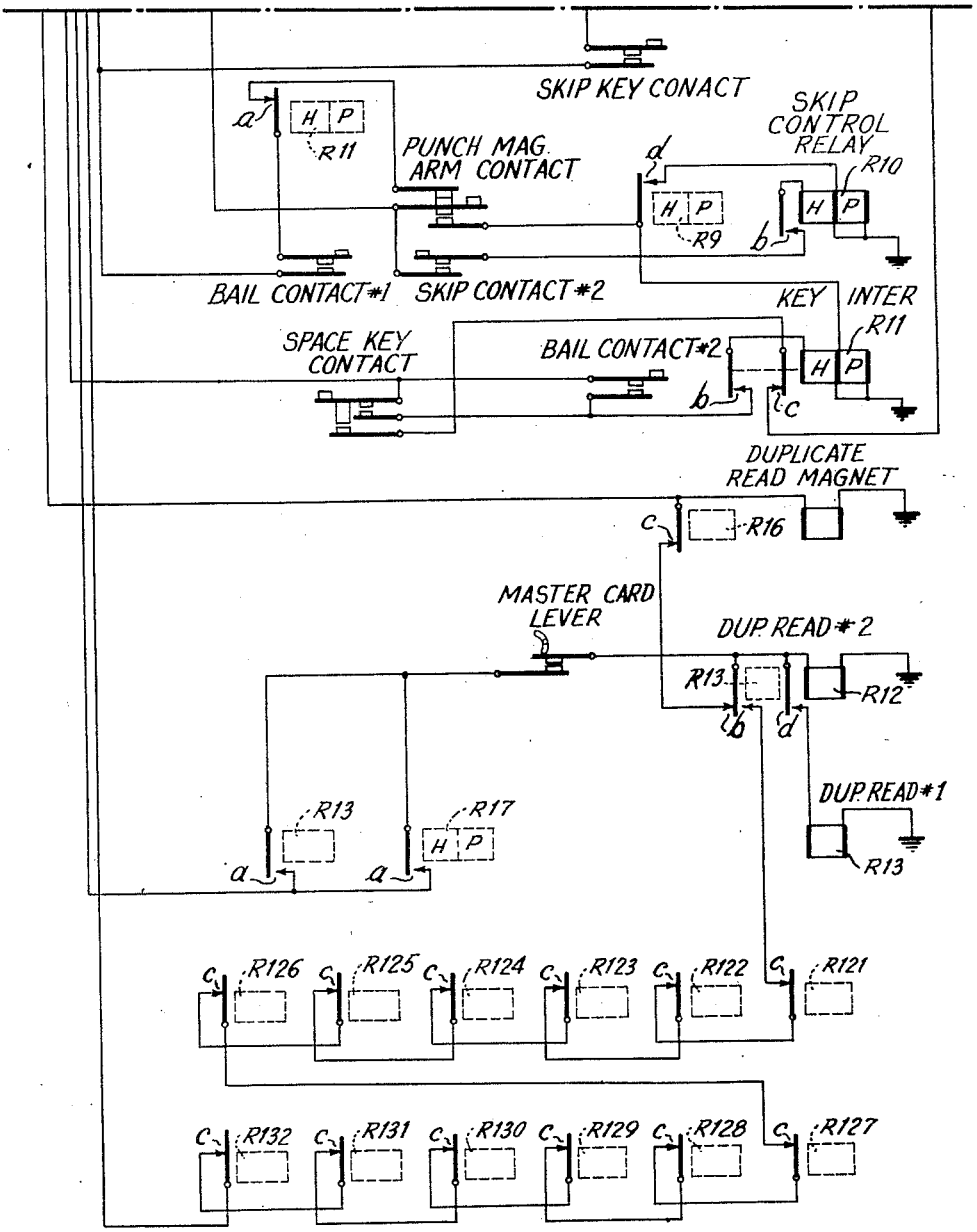
Figure 17E:
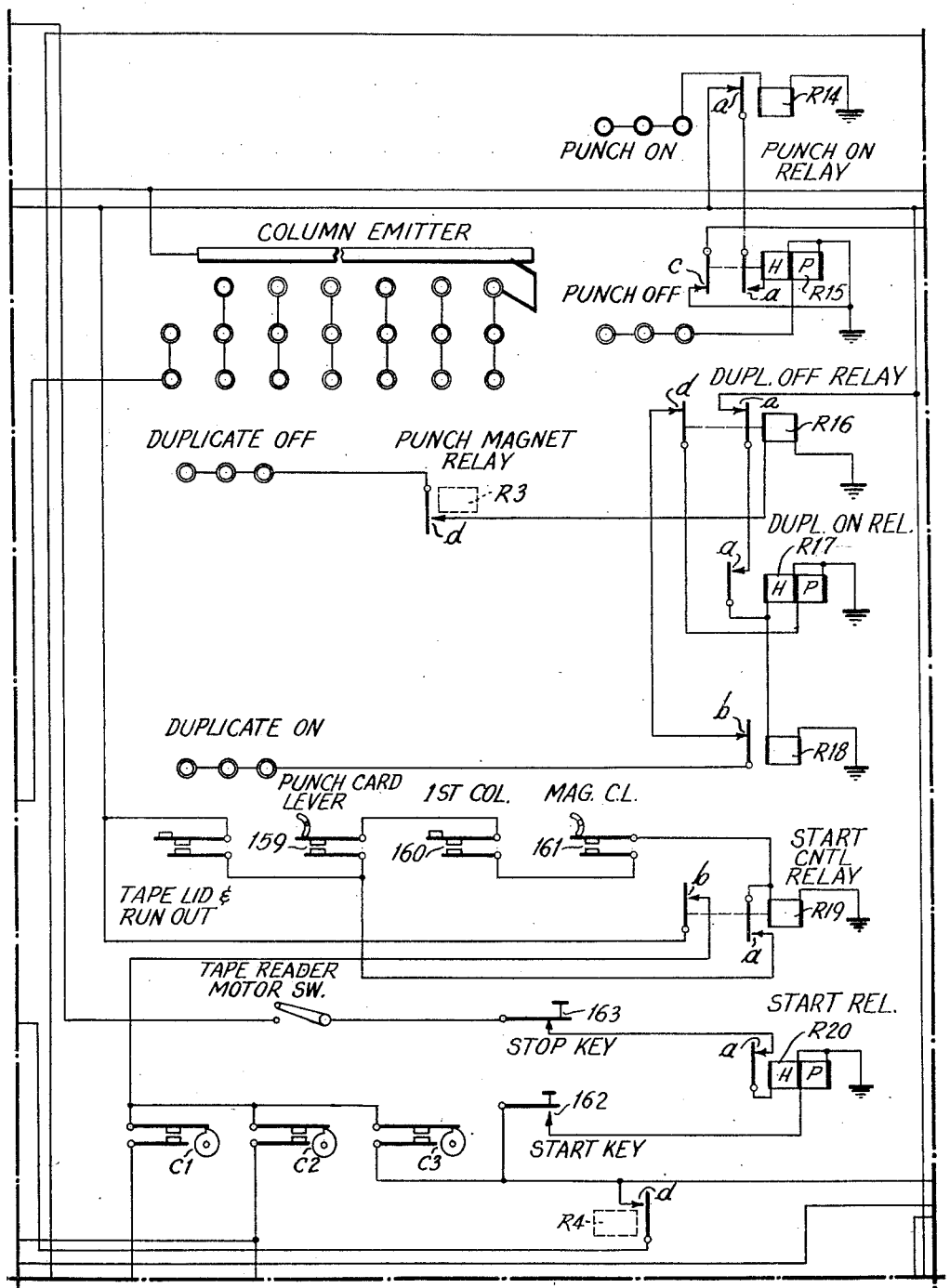
Figure 17F:
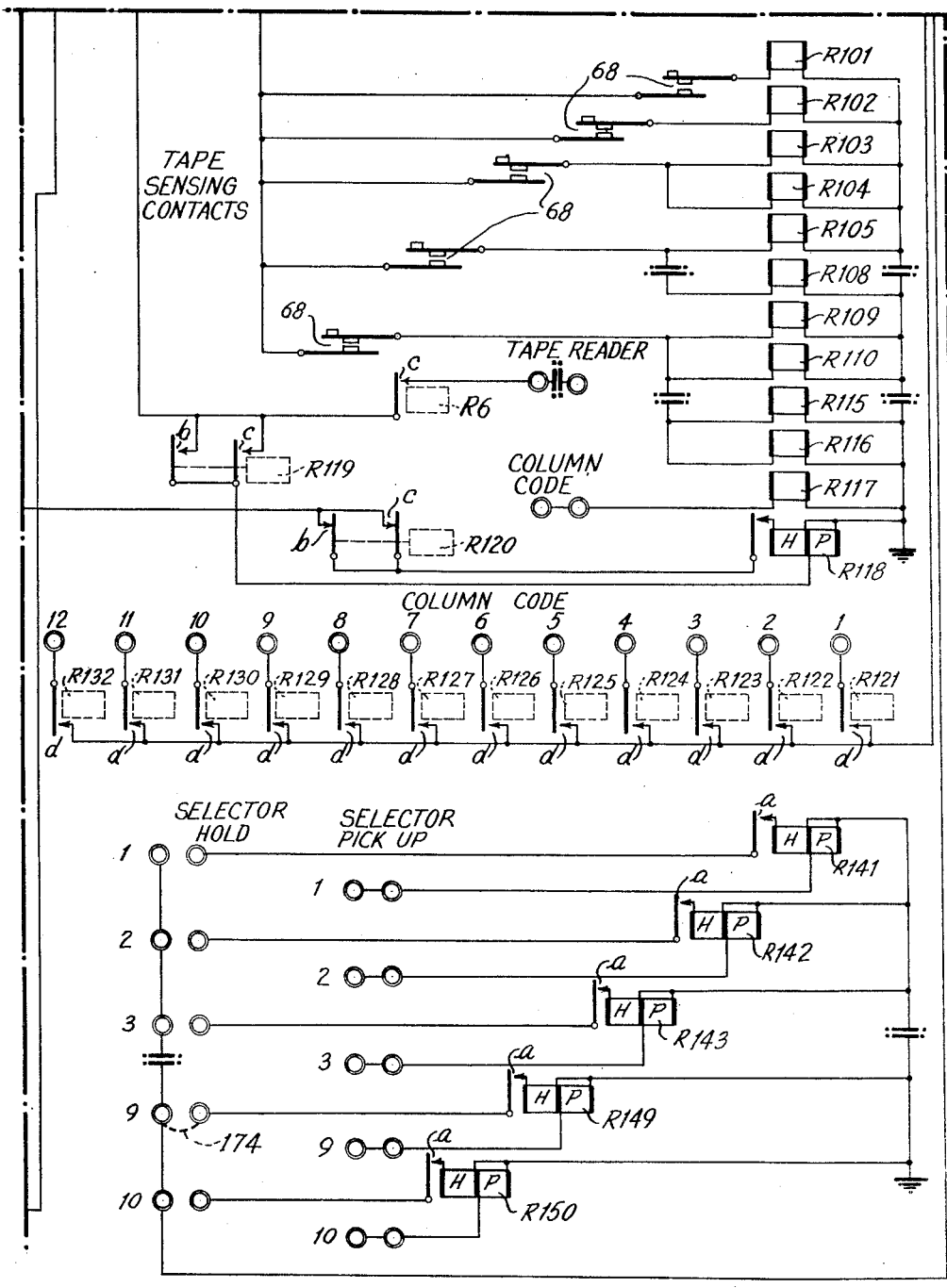
Figure 17G:
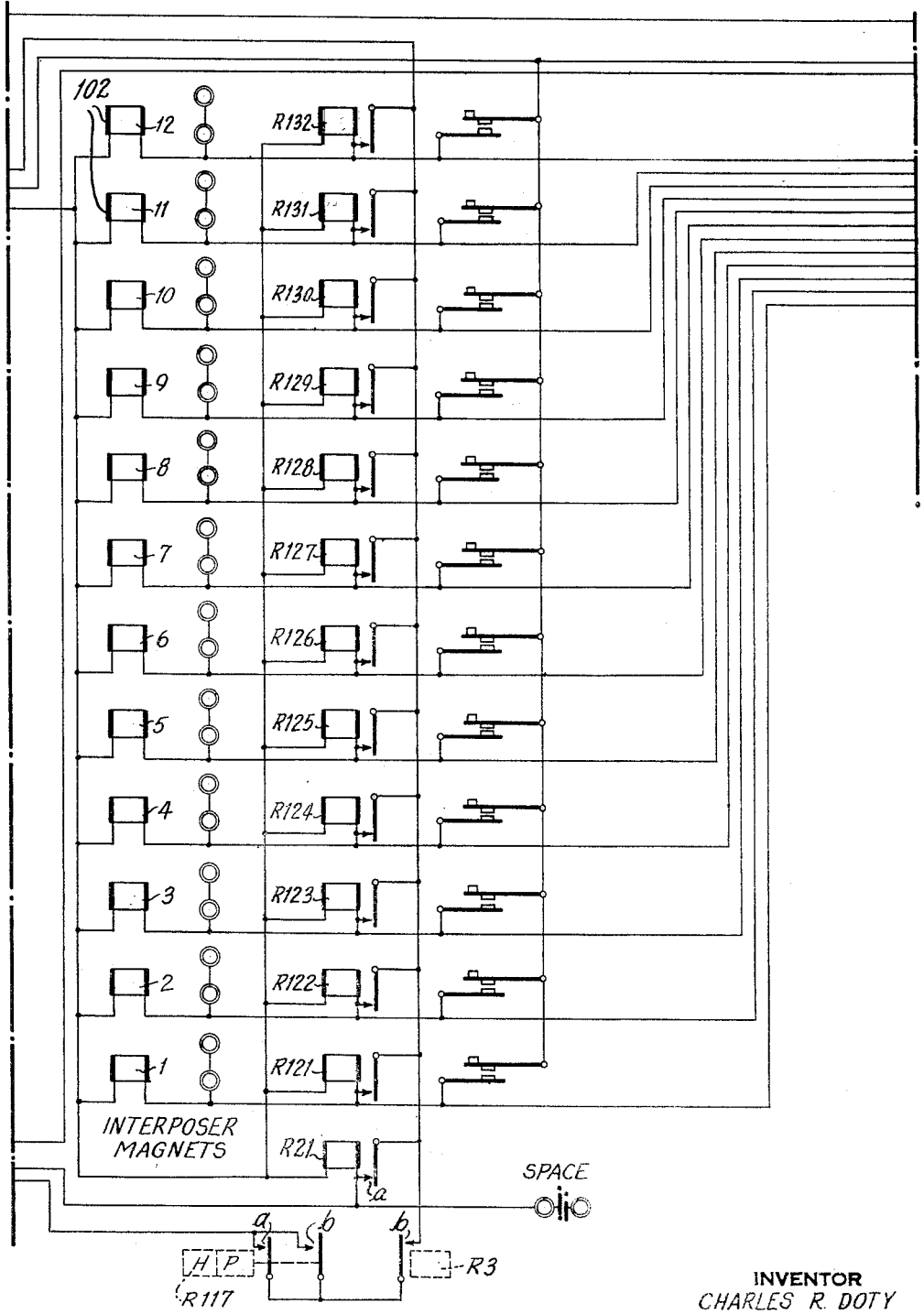

In describing the operation of a typical selector R149 above, it was assumed that the selector was to be operated only during a single impulse from the column emitter. If the selector is to be held throughout the card punching cycle, its hold hubs are interconnected by a plugwire such as 174 (Fig. 17f). This closes a circuit through the motor contact No. 1 (Fig. 17b) to the hold winding of the selector, when the selector closes its "a" contact. This holding circuit is not broken until motor contact No. 1 opens during the ejection of a card.

Special character impulses from tape

Special characters are represented on the tape for control purposes by means of letter codes which are preceded by the figure-shift code. These special characters may be employed for any desired control purpose. In the present machine, the special characters are brought out to the control panel.

Figure 22:
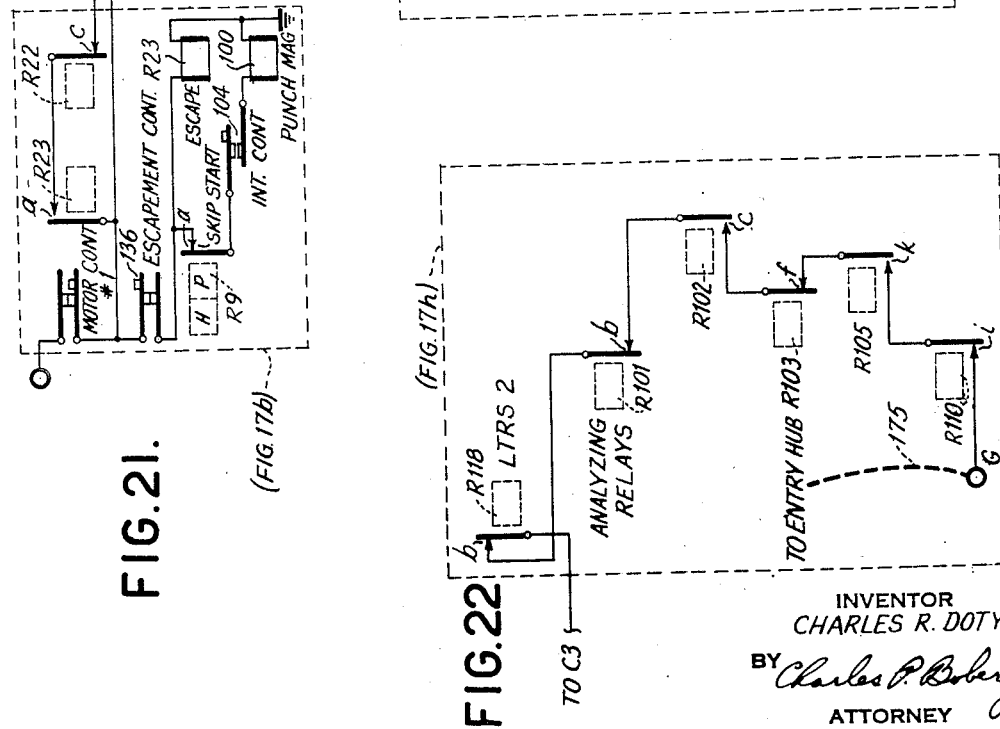

Referring to Fig. 22, there is illustrated a circuit for impulsing the "G" tape reader hub whenever a figure-G code designation is read from the tape. The reading of the figure-shift code causes the "Letters 2" relay R113 to be deenergized, or to remain deenergized as the case may be, keeping its "b" contact in the position shown. Hence, when C-3 closes, the circuit is established through "b" contact of R113, "b" contact of analyzing relay R101, "c" contact of analyzing relay R102, "f" contact of analyzing relay R103, "k" contact of analyzing relay R105 and "i" contact of analyzing relay R110 to the "G" exit hub. From there, a plugwire 175 routes the impulse to the appropriate entry hub on the control panel. Customarily, a figure-G code is employed to initiate a skip operation, as explained hereinabove in connection with Fig. 15.

Column code device—Fig. 19

The column code device is used when it is desired to obtain impulses from the control panel that represent the punching in a selected card column. It comprises a relay R117 (Figs. 17 and 19) which may be picked up at any card column by means of a plugwire 177 extending from the desired card column emitter hub to the pickup hub of the column code device. It will be assumed that a digit 1 punching is present in the selected card column. Under this condition the interposer magnet 102 and the interposer relay R121 corresponding to the digit 1 are energized. The column code relay R117 and the interposer relay R121 close their several contacts as shown in Fig. 19. As the punching takes place in that particular column, the punch magnet relay R3 closes its "b" contact and thereby extends a circuit through "a" and "b" contacts of R117 and the "d" contact of R121 to the No. 1 column code exit hub. Thus, an impulse is made available at this hub in response to the punching of a "1" hole in the selected card column for which the column code device is made active. This impulse can be routed to an entry hub on the control panel to initiate a desired function such as skipping, releasing, punching, tape reading and duplication.

Add impulse—Fig. 20

The "Add" hub on the control panel emits an impulse whenever a code is read in the tape and whenever a key or the space bar is depressed on the keyboard. Considering first the add impulse which originates in the tape reader, closure of the circuit breaker C-3 at a time when the tape reader is on extends a circuit through relay contact R6d to the "Add" hubs. When a character key on the manual keyboard is operated, a bail contact is closed for extending circuit to the "Add" hubs. Whenever the card carriage is spaced, the space relay R21 closes its "d" contact, and if the tape reader is off, this extends a circuit to the "Add" hubs.

Space, carriage return and line feed impulses from tape—Fig. 26

The analyzing circuits for originating impulses at the line feed (LF), space (SP) and carriage return (CR) hubs on the control panel are shown diagrammatically in Fig. 26. These impulses are available for effecting certain functions, some of which have been described already and others of which will be referred to hereinafter.

Considering the space code as an example, this code may be preceded by either a figure-shift or a letter-shift code in the tape. If figures are being read, the space code will cause a circuit to be established through C-3, "b" contact of R118 and the analyzing relay contacts R101b, R102d, R103g, R106b, and R111d to the SP hubs. On the other hand, if letters are being read from the tape, the circuit extends through C-3, "c" contact of R118 and the analyzing relay contacts R101f, R102l, R104k, R108j and R116b to the SP hubs. Thus, the SP hubs are activated in response to a space code irrespective of whether figures or letters are being read from the tape.

In similar fashion the LF hubs are activated in response to a line feed code, and the CR hubs are activated in response to a carriage return code, regardless of whether letters or figures are being read.

Card carriage spacing—Fig. 27

The "Space" (SP) hubs in the card punch group normally are wired directly to the "Space" (SP) hubs in the tape reader group on the control panel. This causes the card carriage to be spaced one step each time a space code is read in the tape. Alternative wiring can, of course, be employed if the card carriage is to be spaced in response to some other code. Also, the card carriage should be spaced each time the space key on the manual keyboard is depressed. Other provisions (described hereinafter) are made in the machine to effect carriage spacing under control of a master card.

To space the card carriage, an energizing impulse is sent through the space relay R21 (Fig. 27). This impulse may come through a plugwire 80 to the "Space" hubs or through the space key contact by way of the relay contact R11c, depending upon whether the spacing step is to be initiated by a tape code or by actuation of the space bar on the keyboard. Relay R21 energizes, closing its "a," "b" and "c" contacts. Closure of the "d" contact establishes a holding circuit for R21. Closure of the "b" contact of R21 causes the punch magnet 100 to operate the motor bar of the card punch unit. Inasmuch as none of the punch interposers are active at this time, no punching will be effected, but the space bar will be actuated to step the card carriage one column space.

Closure of relay contact R21c establishes a safety circuit which causes the "Non-Check" relay R5 to operate if the space relay R21 is energized after last-column relay R4 is energized. Hence, if an attempt is made to space the carriage after it has reached its last-column position, a non-check results.

The space relay R21 is held energized through its holding circuit including the "a" contact of escape relay R23, "c" contact of release relay R22 and "a" contact of R21 while the card carriage is escaping to its next position. When this step of movement is completed and the escape relay R23 is deenergized, the holding circuit for R21 is broken.

Card skipping—Fig. 28

The card carriage can be skipped under the control of the card column emitter, the tape reader, a column code device or the skip key on the keyboard. When the skip is to be performed automatically, the skip hubs are connected by a plug wire 182 (Fig. 28) to the appropriate exit hub (which may be a card column hub, a tape reader exit hub or column code exit hub). An impulse sent over this plugwire travels through the skip hubs, the relay contacts R8d and R18c and the pickup coil of skip start relay R9. This relay energizes and is held through its "b" contact and the relay contacts R2a and R4a. At the same time, the skip magnet 123 is energized. In the manner explained above, the skip magnet 123 actuates the skip lifter and also closes its contacts 138 and 139. As contact 138 closes, it causes the punch 100 and the punch magnet relay R3 to be energized. Concurrent operation of the skip magnet 123 and punch magnet 100, as explained above, starts the skipping motion of the card carriage. Also, as punch magnet 100 operates, it transfers the punch magnet armature contacts 135, thereby picking up the skip control relay R10, which is held through skip contact 139. The key interlock relay R11 is picked up in parallel with R10 to prevent operation of the keyboard during the skip operation.

When a skip stop is encountered on the skip bar, the escapement contact 136 on the carriage is closed (this contact having previously been opened at the start of the skip). This extends a circuit through the "c" contacts of R10 and R3 to the skip stop relay R2. The consequent energization of R2 breaks the holding circuit for skip start relay R9 and skip magnet 123. Skip contact 139, in opening, breaks the holding circuit for R10. The circuits therefore are restored to their normal conditions as the skip is completed.

During the skipping operation, the skip start relay R9 opens its "c" contact in the holding circuit of the "Tape Read On" relay R6, thereby preventing operation of the tape reader.

When the skip key on the keyboard is depressed, the skip key contact and bail contact are closed. This completes a circuit to skip start relay R9, which initiates skipping in the manner just described.

Punch control—Fig. 30

With the present machine it is possible to prevent punching while the tape reader is operating. To do this, a plugwire connection 184 is made from the "Punch off" hubs to the appropriate exit hub, for example, a card column hub. An impulse through this connection picks up the "Punch off" relay R15. R15 is held through its "a" contact and the "a" contact of the "Punch On" relay R14. In energizing, R15 opens its "c" contact, thereby preventing any of the interposer magnets and interposer relays from being operated. With the punch interposer elements disabled in this fashion, no punching can take place, and the card carriage remains stationary while the tape reading continues.

When a point is reached at which punching is to commence again, an impulse is sent through plugwire 185 to the "Punch On" hubs for energizing the relay R14. As the "a" contact of relay R14 opens, it breaks the holding circuit for the "Punch Off" relay R15. Only a momentary impulse to R15 is needed for this purpose. With relay contact R15c restored, normal punching can be resumed.

It is unnecessary to make any special plugwire connection to the "Punch On" hubs at the start of the card punching cycle, inasmuch as punching commences automatically. It is only where the punch has been turned off by operation of R15 that R14 is required to operate.

Duplication—Fig. 25

If part of the information that is being punched into the record card is to be duplicated from a master card, the "Duplicate On" hubs are connected by plugwire 188 (Fig. 25) to the hub of the card column at which duplication is to commence, and the "Duplicate Off" hubs are connected by a plugwire 189 to the hub of the last column that is to be duplicated. This has been explained above in connection with Fig. 15.

When the first column to be duplicated is reached in the course of the punching operation, an impulse is sent through the wire 188, "Duplicate On" hubs, "b" contact of relay R18, "d" contact of "Duplicate Off" relay R16 to the pickup of "Duplicate On" relay R17. R17 is held through relay contacts R16a and R17a. Relay R18 is picked up at the same time and is held with relay R17.

Tape reading must be suspended while duplication is in process. To this end, the relay R17 opens its "c" contact (Fig. 17c) to prevent operation of the "Tape Read On" relay R6 when R17 is energized.

As relay R17 closes its "b" contact (Fig. 25), a circuit is completed through motor contact No. 1, escapement contact 136, column cutout contact 149, relay contact R17b, master card lever contact, relay contact R13b, and relay contact R16c to the "Duplicate Read" magnet 190. At the same time the "Duplicate Read" relay R12 is picked up, and through its "c" contact it picks up the "Duplicate Read" relay R13. As R13 energizes, it breaks the circuit to the "Duplicate Read" magnet 190. During the short interval in which magnet 190 is energized, it actuates a series of master card sensing pins 191, for sensing the index points in a column of the master card. Each of these pins controls a pin contact such as the contact 194 (Fig. 25) corresponding to the digit 5. Assuming that this contact is closed, due to the presence of a perforation in the master card, it causes the No. 5 interposer magnet and interposer relay 125 to operate in the familiar manner. The punch magnet 100 and punch magnet relay R3 operate together when interposer contact 184 closes.

If the master card column is blank, the interposers will not be operated and the interposer contact 184 remains open. Usually, it is desired that blank columns be duplicated, and under these circumstances the auto space switch 192 (Fig. 25) is turned to its "on" position. The "c" contacts of the various interposer relays 121 to 132, inclusive, form a series path when all of these interposer relays are deenergized. With the "d" contact of "Duplicate Read" relay R13 closed, a circuit is completed through this series path and the auto space switch 192 to the punch magnet 100 and its associated relay R3. Operation of the punch magnet 100 causes the rack to space one step. This is repeated each time the escapement contact 136 closes, as long as blank columns are encountered.

When the last column to be duplicated is reached, and the punch magnet relay R3 is energized, the impulse through plugwire 189 to the "Duplicate Off" hubs becomes effective to energize the "Duplicate Off" relay R16. This causes the holding circuit for "Duplicate On" relay R17 to be broken and prevents any further duplication. Normally the next column is wired to "Tape Read On," which causes the machine to operate under control of the tape reader again.

Controlled auto space—Fig. 29

The auto space control (ASC) hubs (Figs. 29 and 14) may be shunted by the switch 192, if it is desired to duplicate every blank column of the master card during duplication. There may be other instances in which only certain blank columns are to be duplicated.

For example, there may be an alphabetic field in which, due to varying lengths of names, an indeterminate number of blank columns will be present. These may be skipped or duplicated, as preferred. On the other hand, if a numerical field is being duplicated, there should be no blank columns. The occurrence of a blank column therefore signifies that something is wrong.

In the present example, it is assumed that the numerical field commences at column 64 of the master card. The column 64 hub of the emitter is connected by a plugwire 195 to a selector pickup hub, for example, the pickup hub of the selector relay R141. Blank columns preceding column 64 are to be duplicated. Hence, the N and C hubs of selector R141 are respectively connected by plugwires 196 and 197 to the ASC hubs. This places a shunt across the ASC hubs until selector R141 is picked up. When selector R141 is picked up at column 64, this shunt is removed. To maintain selector R141 energized, the hold hubs are interconnected by a jumper 198.

Commencing with column 64, the interposer contact 184 should be closed for each column read. In other words, a perforation should be present in each column. The punch magnet 100 operates in response to each closure of the interposer contact 104 to punch a digit and space the carriage. If a blank column is encountered, the punch magnet 100 cannot operate because the contacts of selector R141 are now transferred so that they no longer shunt the ASC hubs, and the series circuit which would normally be established through the "c" contacts of the interposer relays is not completed. Card punching and master card reading operations thereupon stop until the condition is remedied.

Recoding

Any code read from the tape and which is available at the control panel can be recoded into a different form of character when punched in the card. For example, it may be desired to convert all space codes read from numerical fields in the tape to zeros in the corresponding card fields. To accomplish this, appropriate plugwire connections are made from the SP hubs in the tape character group through a selector to the zero hub in the card punch group. The selector is transferred during the columns in which recoding is desired, causing space codes read from the tape to be punched as zeroes in the card.

In similar fashion, other tape codes can be recoded to different forms of characters in the card, making use of the necessary plugwire and selector connections.

Where the recoding involves multiple punching, that is, punching two perforations in a card column, a distributor may be employed to prevent back-circuits.

It is also possible to punch an extra perforation in any selected card column by using the impulse from the "Add" hubs.

Gang punching

Under some conditions a predetermined number should be punched in certain columns of each card, this number being identical for all cards punched. In this instance it will be found convenient to utilize plugwire connections from the hubs of the card columns concerned to the digit hubs in the card punch group. As each column hub is activated, it sends an impulse to a digit hub for punching a particular digit in the corresponding card column. Where there are two perforations to be punched in a column, a distributor is inserted into the connection.

8-hole code

The present machine may readily be adapted for operation with an 8-hole tape code. This involves very little change from the structure disclosed herein. Since no figures-shift or letters-shift characters are employed in the 8-hole code, the analyzing relay contact arrangement is simplified. The exit impulses from the tape reader are brought out to hubs on the control panel which are numbered according to the index point positions of a card column, instead of bearing mixed alphabetic and numerical designations as in the illustrated machine.

Error cancellation

Recently developed machines for producing perforated tapes include a feature whereby, if a tape field is incorrectly punched, an error signal is inserted at the end of the field. To utilize a tape of this type in the present machine, it is proposed to feed the tape and the card backward. Under these conditions the tape reader will encounter the error code before it commences to read the incorrectly punched field. A special error signal hub may be utilized to emit an impulse for suppressing the card punch (this "error" hub being plugged to the Punch Off hubs). Tape reading without card punching then takes place until a second signal, such as CR or LF, is received. The exit hub for the second signal is plugged to the "Punch On" hubs to start card punching. The card is punched in reverse order, that is, 80th column first.

Conclusion

From the foregoing description it will be concluded that the disclosed machine is extremely versatile and greatly increases the utility of tape-controlled card punches. Many different operations have been shown and described herein, but these do not exhaust the possible uses of the machine. It will be apparent to those skilled in the art that many more operations can be obtained by proper plugging of the control panel.

Hence, while there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for perforating a record card column-by-column in accordance with information represented by transverse rows of code designations in a record tape, such apparatus comprising tape reading means for sensing and analyzing the code designations in the record tape row-by-row, perforating means for perforating information column-by-column in the record card, means normally effective to transfer information from said tape reading means to said perforating means for causing the card to be perforated column-by-column in accordance with the information represented by the corresponding rows of code designations on the tape, function-controlling elements selectively operable to supersede the action of said normal transfer means for modifying in various predetermined ways the normal transfer of information from the tape to the card, a control panel having exit hubs respectively pertaining to predetermined tape code designations and having entry hubs respectively pertaining to said function-controlling elements, said tape reading means including provisions for rendering a selected one of said exit hubs active whenever one of said code designations is sensed thereby, and readily removable plug connecting means for selectively interconnecting said exit hubs and said entry hubs in accordance with the modification of normal machine operation that is desired, with each of said function-controlling elements becoming operative whenever its related entry hub is connected to an active one of said exit hubs for effecting such modification upon the sensing of a predetermined code designation.

2. Apparatus for perforating a record card column-by-column in accordance with information represented by transverse rows of code designations in a record tape, such apparatus comprising tape reading means for sensing and analyzing the code designations in the record tape row-by-row, card feeding means for causing the card to be advanced progressively as the successive rows of code designations are sensed, perforating means for perforating information column-by-column in the record card, means normally effective to transfer information from said tape reading means to said perforating means for causing the card to be perforated column-by-column in accordance with the information represented by the corresponding rows of code designations on the tape, function-controlling elements selectively operable to supersede the action of said normal transfer means for modifying in various predetermined ways the normal transfer of information from the tape to the card, a control panel having exit hubs respectively pertaining to predetermined tape code designations and having entry hubs respectively pertaining to said function-controlling elements, said tape reading means including provisions for rendering a selected one of said exit hubs active whenever one of said predetermined code designations is sensed thereby, said control panel also having exit hubs respectively pertaining to the various columns of the card, means for rendering said last-mentioned exit hubs active in sequence as the columnar punching of the card progresses, and readily removable plug connecting means for selectively connecting any of said exit hubs to any of said entry hubs in accordance with the modification of normal operation that is desired, with each of said function-controlling elements becoming operable whenever its related entry hub is connected to an active one of said exit hubs for effecting such modification upon the sensing of a predetermined code designation or in response to the movement of the card into a predetermined columnar position.

3. Apparatus for perforating a record card column-by-column in accordance with information represented by transverse rows of indicia in another record, such apparatus comprising means for reading the indicia row-by-row, card feeding means for moving the record card normally in column-by-column fashion as said rows of indicia are being read, movable means automatically positioned to correspond with the position of the card in its columnar movement, selectively operable devices for perforating information in the card a column at a time, means normally effective to transfer information from said reading means to said selectively operable devices for perforating the card columns in accordance with information represented by the rows of indicia that are being read, electrically operable control elements in addition to said transfer means for respectively causing said apparatus to perform various functions that affect the transfer of information to the record card, a control panel having a first group of electric outlets respectively related to said movable means for the various positions thereof, said control panel also having a second group of electric outlets respectively related to various indicia that may be read by said reading means and having a third group of electric outlets respectively connected to said control elements and related to the various functions that may be effected by said control elements, and readily removable plug connecting means cooperable with said outlets for interconnecting said first and second groups of outlets selectively with said third group of outlets, thereby enabling said apparatus to be controlled automatically in response to the positioning of the card and also in response to the types of indicia that are read from said other record.

4. In a record-controlled perforating machine for transferring information from a record tape to a record card, a control panel having a first group of hubs respectively pertaining to predetermined codes in the record tape and having a second group of hubs respectively pertaining to various functions that said machine is capable of performing to determine the manner in which information derived from the tape is represented on the record card, reading means for sensing the codes in the tape, analyzing devices operatively interposed between said reading means and said first hubs for selectively rendering said first hubs active in response to the sensing of predetermined codes in the tape, control elements respectively connected in operative relationship with said second hubs, each of said control elements being effective when operated to govern one of said machine functions, and readily removable plug connecting means cooperable with said hubs to interconnect said first and second groups of hubs selectively for enabling said machine to function in response to and in accordance with the sensing of said predetermined codes in the record tape.

5. In a tape-controlled card perforating machine, tape analyzing means for reading code designations in a control tape, a first group of exit hubs activated by said tape analyzing means selectively in accordance with the code designations read from the control tape, card perforating means, a card carriage for advancing a record card column-by-column through said perforating means, a column emitter operating in unison with said card carriage, a second group of exit hubs activated in sequence by said column emitter as the card advances column-by-column through said perforating means, a plurality of function devices each operable to effect a particular functional operation of said machine, each of said function devices including a control relay having a pickup portion and a hold portion, a plurality of entry hubs each being electrically connected to the pickup portion of a respective control relay, plugwires for connecting said entry hubs selectively with said first and second groups of exit hubs according to a desired program of machine operations, and a plurality of individual holding circuits for said control relays respectively including the hold portions of said relays, with the holding circuit for each of said relays including at least one interlock contact operated by another of said relays whereby said relays have mutual governing effects upon their several holding circuits.

6. Card perforating apparatus controlled by a tape having individual messages each consisting of a series of data designations followed by a special designation signifying the end of a message, such apparatus comprising a tape reader for reading successively the data designations and the special designation included in each message on the tape, card perforating means, a card carriage for presenting successive columns of a record card to said perforating means, analyzing means under the control of said tape reader for normally effecting operation of said card perforating means in response to the sensing of data designations by said tape reader, said analyzing means also having exit plughubs for selectively emitting impulses in response to the sensing of said special designations, a column emitter operating in unison with said carriage for emitting an impulse each time a selected column of the card is presented to said perforating means, a non-check device operable in a manner indicating that the card carriage and the tape reader are not in step with each other, a release device operable in a manner indicating that the card carriage and tape reader are in step with each other, relay means adapted to be connected to said column emitter for operation in response to the emission of a selected column impulse, said relay having an entry plughub and transferrable contact means for alternatively connecting said entry plughub with said non-check device and said release device, and readily removable plug-connecting means for interconnecting said entry plughub selectively with any of said exit plughubs to route a selected impulse from said analyzing means through said transferrable contact means to said non-check device and to said release device in accordance with the relative times at which said selected column impulse and said special designation impulse occur.

7. Card perforating apparatus controlled by a tape having individual messages each consisting of successive code designations representing data characters to be perforated in a card, such apparatus comprising a tape reader for successively reading said code designations in the tape, card perforating means including punch elements and associated interposer elements, carriage means for presenting successive columns of a record card to said punch elements in step with the sensing of code designations by said tape reader, analyzing means controlled by said tape reader and governing said interposer elements to select said punch elements for operation in accordance with the code designations read from the tape, a last-column device arranged to be operated when said carriage attains its last-column position, a series of interposer contacts respectively actuated by said interposer elements as an incident to each column perforating operation, and a safety device controlled by said last-column device and said interposer contacts to interrupt the operation of said apparatus if any of said interposer contacts is actuated after said last-column device is operated, thereby indicating that the card and the tape have fallen out of step with each other.

8. In a card perforating machine adapted to operate under the control of a tape bearing representations of data characters to be perforated in a record card and also bearing representations of special characters employed for control purposes, the combination of a tape reader, analyzing means controlled by said tape reader having exit hubs corresponding respectively to the various character representations recorded in the tape for emitting impulses from said exit hubs whenever the respective characters are sensed by said tape reader, card perforating elements having individual entry hubs adapted to be selectively impulsed for causing data character representations to be perforated in the record card by the respective perforating elements, a plurality of function devices each operable to effect a functional operation of the machine and each having an individual entry hub adapted to be impulsed for causing such function device to operate, and readily removable plug connectors for selectively interconnecting said tape reader exit hubs with the entry hubs of said perforating elements and said function devices whereby the impulses emitted by said exit hubs are routed to said entry hubs for controlling the perforating and functional operations of the machine.

9. A machine comprising the combination set forth in claim 8, and a one-way impulse distributor for routing an impulse from one of said tape reader exit hubs to a plurality of said entry hubs, said distributor having an entry hub adapted to be plug-connected to said tape reader exit hub and having a plurality of exit hubs respectively adapted to be plug-connected to said plurality of entry hubs.

10. A machine comprising the combination set forth in claim 8, an additional exit hub on said tape reader for emitting an impulse each time said tape reader senses a tape character, and readily removable plug-connecting means for connecting said additional exit hub to one of the entry hubs of said card perforating elements whereby an impulse from said additional exit hub causes an additional perforation to be made in a card column.

11. In a card punching machine adapted to operate under the control of a tape bearing representations of data characters to be recorded in a record card and also bearing representations of special characters employed for control purposes, the combination of a tape reader having exit hubs corresponding respectively to the special characters read from the tape for emitting impulses whenever the respective characters are sensed by said tape reader, card punching means controlled by said tape reader, a carriage for presenting the columns of a record card in succession to said card punching means, a column emitter operating in unison with said carriage and having a series of exit hubs adapted to emit impulses in succession as the successive columns of the card are presented to said card punching means, tape reader control means having entry hubs adapted to receive impulses for starting and stopping the operation of said tape reader, and readily removable plug conectors for selectively interconnecting said entry hubs with any of the exit hubs of said tape reader and said column emitter.

12. In a card punching machine adapted to operate under the control of a tape bearing representations of data characters to be recorded in a record card and also bearing representations of special characters employed for control purposes, the combination of a tape reader having exit hubs corresponding respectively to the special characters read from the tape for emitting impulses whenever the respective characters are sensed by said tape reader, card punching means controlled by said tape reader, a carriage for presenting the columns of a record card in succession to said card punching means, a column emitter operating in unison with said carriage and having a series of exit hubs adapted to emit impulses in succession as the successive columns of the card are presented to said card punching means, punch control means having entry hubs adapted to receive impulses for starting and stopping the operation of said card punching means, and readily removable plug connectors for selectively interconnecting said entry hubs with any of the exit hubs of said tape reader and said column emitter.

13. In a card punching machine adapted to operate under the control of a tape bearing representations of data characters to be recorded in a record card and also bearing representations of special characters employed for control purposes, the combination of a tape reader having exit hubs corresponding respectively to the special characters read from the tape for emitting impulses whenever the respective characters are sensed by said tape reader, card punching means controlled by said tape reader, a carriage for presenting the columns of a record card in succession to said card punching means, a column emitter operating in unison with said carriage and having a series of exit hubs adapted to emit impulses in succession as the successive columns of the card are presented to said card punching means, skip control means having an entry hub adapted to receive an impulse for initiating a skip operation of said carriage, and readily removable plug connecting means for selectively connecting said entry hub with any of the exit hubs associated with said tape reader and said column emitter.

14. In a card punching machine adapted to operate under the control of a tape bearing representations of data characters to be recorded in a record card and bearing additional representations of special characters usable for control purposes, and which machine also is operable to duplicate information from a master card onto said record card, the combination of a tape reader having exit hubs corresponding respectively to the special characters read from the tape for emitting impulses whenever the respective characters are sensed by said tape reader, card punching means normally controlled by said tape reader for punching said data characters in the record card, a carriage for presenting the columns of said record card in succession to said card punching means, a column emitter operated in unison with said carriage and having a series of exit hubs adapted to emit impulses in succession as the successive card columns are presented to said punching means, a master card reader for reading information from the master card to be duplicated in the record card, tape reader control means having entry hubs adapted to receive impulses for starting and stopping the operation of said tape reader, duplicating control means having entry hubs adapted to receive impulses for starting and stopping the operation of said master card reader, and readily removable plug connectors for selectively interconnecting the entry hubs of said tape reader control means and said duplicating control means with the exit hubs of said tape reader and said column emitter.

15. Apparatus for perforating a columned record card in accordance with information read from a master card having columns which are perforated to represent data characters and having other columns which are blank, said apparatus comprising a master card reading device for reading the columns of the master card consecutively, a series of punch elements arranged to perforate the record card a column at a time, a card carriage for presenting the columns of a record card successively to said punch elements, a series of interposer elements respectively associated with said punch elements and controlled by said master card reader, said interposer elements being selectively movable into active positions for rendering their respective punch elements active, a carriage spacing means effective when operated to advance said carriage a column position at a time, common operating means for said carriage spacing means controlled by said interposer elements and effective when any of said interposer elements is moved to an active position for operating said carriage spacing means, and auto-spacing means for operating said carriage spacing means to advance the record card one column position each time a blank column is read in the master card, said auto-spacing means including an electrical circuit effective when closed to render said auto-spacing means operative and including a series of contact devices respectively associated with said interposer elements, each of said contact devices being arranged to interrupt said circuit if any of said interposer elements is moved into its active position, and switch means in said circuit controlled by the position of said carriage for rendering said auto-spacing means effective only when a particular field of the record is presented to said punch elements.

16. The combination set forth in claim 15, wherein said switch means includes a column emitter operated by said carriage spacing means, and a selector relay under control of said emitter having contacts in said electrical circuit.

17. Apparatus for perforating a card in statistical code under the control of a tape having telegraphic code designations therein preceded by letters-shift and figures-shift code designations to signify whether the telegraphic code designations represent alphabetic or numerical characters, such apparatus comprising a tape reader for successively reading the telegraphic code designations in the tape, card punching means for punching designations in the card according to a statistical code, translating means controlled by said tape reader including analyzing circuits with letters and figures supervisory devices for determining which of the analyzing circuits shall be active according to the presence of letters-shift and figures-shift code designations respectively in the tape, a control panel having exit hubs adapted to be activated by said analyzing circuits for emitting impulses whenever predetermined code designations are read from the tape, said exit hubs including letters and figures hubs, circuits respectively controlled by said letters and figures supervisory devices for causing said letters and figures hubs to emit impulses when letters-shift and figures-shift code designations are respectively read from the tape, a plurality of function devices in said machine each operable to effect a given functional operation of the machine, entry hubs on said control panel operatively connected to said function devices and adapted to receive impulses for causing the respective function devices to operate, and readily removable plug connections on said control panel for routing impulses selectively from said exit hubs to said entry hubs.

18. Apparatus for perforating a card under the control of a tape having code designations therein representing data characters to be recorded in the card and having additional code designations for controlling functional operations of the machine, comprising a tape reader for reading the code designations from the tape, card punching means controlled by said tape reader for punching data characters in the card in accordance with the code designations in the tape, a control panel having exit hubs respectively corresponding to predetermined code designations in the tape and controlled by said tape reader to emit impulses whenever such code designations are read, said control panel also having an exit hub controlled by said tape reader to emit an impulse each time that a code designation of any kind is read, a plurality of function devices in said machine each operable to effect a given functional operation of the machine, a plurality of entry hubs on said control panel operatively connected to said function devices and adapted to receive impulses for causing said function devices to operate, and readily removable plug connections on said control panel for routing impulses selectively from said exit hubs to said entry hubs.

19. Apparatus for perforating a card under the control of a tape having code designations therein representing data characters to be recorded in the card and having additional code designations for controlling functional operations of the machine, comprising a tape reader for reading the code designations from the tape, card punching means controlled by said tape reader for punching data characters in the card in accordance with the code designations in the tape, means for ejecting each card after the same is punched, a control panel having exit hubs respectively corresponding to predetermined code designations in the tape and controlled by said tape reader to emit impulses whenever such code designations are read, said control panel also having an exit hub controlled by said card ejecting means to emit an impulse each time that said card ejecting means operates, a plurality of function devices in said machine each operable to effect a given functional operation of the machine, a plurality of entry hubs on said control panel operatively connected to said function devices and adapted to receive impulses for causing said function devices to operate, and readily removable plug connections on said control panel for routing impulses selectively from said exit hubs to said entry hubs.

20. In a tape-controlled card perforating machine, a tape reader for reading code designations from a tape, card perforating means controlled by said tape reader, card feeding means for advancing a card by progressive steps through said card perforating means to be perforated in accordance with the code designations read from the tape, a control panel having impulse exit hubs arranged to be activated selectively by said tape reader and by said card feeding means in accordance with the information read from the tape and also in accordance with the progressive positioning of said card, a plurality of function devices each operable to effect a functional operation of the machine, a plurality of entry hubs operatively associated with said function devices and adapted to receive impulses for respectively operating said function devices, connecting devices extending between certain of said exit hubs and certain of said entry hubs for routing impulses in a selected manner therebetween, at least one of said connecting devices including a selector relay controlled from one of said exit hubs for routing the impulses emitted by another of said exit hubs through alternative paths depending upon the operative states of said relay, and selector hold means including a pair of terminals adapted to be interconnected for establishing a circuit to hold said selector relay energized for the duration of a card perforating operation.

21. Apparatus controlled by a tape for perforating data in a card having columns of index points in which perforations may be formed selectively to represent data according to a statistical code, such apparatus comprising a tape reader, card punch means including a plurality of punch elements respectively arranged to make perforations in a card column at the various index points therein, a plurality of interposer elements respectively associated with said punch elements and controlled by said tape reader, each of said interposer elements being movable into an active position for rendering its punch element operative, a plurality of column code contacts respectively pertaining to said interposer elements, means for individually actuating said contacts as the corresponding interposer elements are moved into their active positions, whereby the settings of said contacts are indicative of the statistical code designation being perforated in a card column, and circuit-making means for extending circuits through the actuated column code contacts to indicate the index points at which perforations are being made by said punch elements.

CHARLES R. DOTY.

References Cited in the file of this patent
UNITED STATES PATENTS

| Number | Name | Date |
|---|---|---|
| 1,962,750 | Read | June 12, 1934 |
| 1,976,600 | Carroll | Oct. 9, 1934 |
| 2,063,475 | Wellman | Dec. 8, 1936 |
| 2,157,040 | Von Pein | May 2, 1939 |
| 2,340,801 | Doty and Rabenda | Feb. 1, 1944 |